US011260303B2

United States Patent
Wei

(10) Patent No.: US 11,260,303 B2
(45) Date of Patent: Mar. 1, 2022

(54) METHOD AND APPARATUS FOR ADJUSTING ATTRIBUTES OF OBJECT, STORAGE MEDIUM, AND ELECTRONIC DEVICE

(71) Applicant: Tencent Technology (Shenzhen) Company Limited, Shenzhen (CN)

(72) Inventor: Jiacheng Wei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 78 days.

(21) Appl. No.: 16/860,895

(22) Filed: Apr. 28, 2020

(65) Prior Publication Data
US 2020/0254347 A1 Aug. 13, 2020

Related U.S. Application Data

(63) Continuation of application No. PCT/CN2019/072410, filed on Jan. 18, 2019.

(30) Foreign Application Priority Data

Jan. 22, 2018 (CN) .......................... 201810060253.6

(51) Int. Cl.
*A63F 13/67* (2014.01)
*A63F 13/52* (2014.01)
(Continued)

(52) U.S. Cl.
CPC .............. *A63F 13/67* (2014.09); *A63F 13/52* (2014.09); *A63F 13/533* (2014.09); *A63F 13/69* (2014.09)

(58) Field of Classification Search
None
See application file for complete search history.

(56) References Cited

U.S. PATENT DOCUMENTS

| 4,679,789 A * | 7/1987 | Okada | A63F 13/10 463/23 |
| 2008/0161080 A1 * | 7/2008 | Terasaki | A63F 13/80 463/9 |

FOREIGN PATENT DOCUMENTS

| CN | 105457275 A | 4/2016 |
| CN | 106055358 A | 10/2016 |

(Continued)

OTHER PUBLICATIONS

Trion, Rift, Aug. 11, 2015, https://web.archive.org/web/20150811215202/https://www.trionworlds.com/rift/en/game/what-is-rift/ (Year: 2015).*

(Continued)

*Primary Examiner* — Kevin Y Kim
(74) *Attorney, Agent, or Firm* — Morgan, Lewis & Bockius LLP

(57) ABSTRACT

Embodiments of the present disclosure disclose a method and an apparatus for adjusting attributes of an object, a storage medium, and an electronic device. The method includes: displaying, by a terminal, target prompt information in a target interface of a client as a target scene is run on the client, the target prompt information being used for prompting the adjustment of the attributes of a virtual control object controlled by a player in the target scene; determining, by the terminal according to preset configuration information of the target scene, an adjustment mode of performing adjustment; and automatically adjusting, by the terminal, the attributes of the virtual control object in a case that the determined adjustment mode is an automatic adjustment mode. The embodiments of the present disclosure solve the technical problem that it is insufficiently flexible to adjust the attributes of a virtual control object in the related art.

17 Claims, 10 Drawing Sheets

(51) Int. Cl.
    *A63F 13/533*     (2014.01)
    *A63F 13/69*     (2014.01)

(56) References Cited

FOREIGN PATENT DOCUMENTS

| CN | 106095516 A | 11/2016 |
|---|---|---|
| CN | 108319478 A | 7/2018 |
| WO | WO 2015168749 A1 | 11/2015 |

OTHER PUBLICATIONS

Clovara, "New to rift and confused about souls," Jan. 14, 2013, http://forums.riftgame.com/general-discussions/newcomers/348122-new-rift-confused-about-souls.html (Year: 2013).*
Tencent Technology, ISR, PCT/CN2019/072410, Apr. 16, 2019, 2 pages.
Tencent Technology, WO, PCT/CN2019/072410, Apr. 16, 2019, 4 pgs.
Tencent Technology, IPRP, PCT/CN2019/072410, Jul. 28, 2020, 5 pgs.

* cited by examiner

METHOD AND APPARATUS FOR ADJUSTING ATTRIBUTES OF OBJECT, STORAGE MEDIUM, AND ELECTRONIC DEVICE

RELATED APPLICATION

This application is a continuation application of PCT Application No. PCT/CN2019/072410, entitled "OBJECT ATTRIBUTE ADJUSTMENT METHOD AND DEVICE, STORAGE MEDIUM AND ELECTRONIC DEVICE" filed on Jan. 18, 2019, which claims priority to Chinese Patent Application No. 201810060253.6, entitled "METHOD AND APPARATUS FOR ADJUSTING ATTRIBUTES OF OBJECT, STORAGE MEDIUM, AND ELECTRONIC DEVICE" filed with the Chinese National Intellectual Property Administration on Jan. 22, 2018, all of which are incorporated by reference in their entirety.

FIELD OF THE TECHNOLOGY

Embodiments of the present disclosure relate to the field of computers, and in particular, to a method and an apparatus for adjusting attributes of an object, a storage medium, and an electronic device.

BACKGROUND OF THE DISCLOSURE

At present, the attributes of a virtual control object significantly affect the combat experience of players in a scene.

An advanced player may autonomously select an appropriate mode to adjust the attributes of a virtual control object to maximize the enhancement of the virtual control object. The autonomous adjustment of the attributes of a virtual control object imposes a knowledge burden on a beginner player. Slightly complex adjustment rules and appropriate selection of attributes deprive a player of pure combat experience, leading to a problem that it is insufficiently flexible to adjust the attributes of a virtual control object.

In view of the foregoing problem that it is insufficiently flexible to adjust the attributes of a virtual control object, no effective solution has been provided at present.

SUMMARY

Embodiments of the present disclosure provide a method and an apparatus for adjusting attributes of an object, a storage medium, and an electronic device, so as to at least solve the technical problem that it is insufficiently flexible to adjust the attributes of a virtual control object in the related art.

According to an aspect of the embodiments of the present disclosure, a method for adjusting attributes of an object is performed at a terminal while executing a target scent of a client, the method including: displaying, by the terminal, target prompt information in a target interface of the client, the target prompt information being used for prompting the adjustment of the attributes of a virtual control object controlled by a player in the target scene; in response to the target prompt information, determining, by the terminal according to preset configuration information of the target scene, an adjustment mode; and automatically adjusting, by the terminal, the attributes of the virtual control object in a case that the determined adjustment mode is an automatic adjustment mode.

According to another aspect of the embodiments of the present disclosure, a non-transitory computer readable storage medium is further provided. A plurality of computer programs are stored in the storage medium, and the computer programs are configured to be executed to perform the aforementioned method for adjusting attributes of an object according to the embodiments of the present disclosure.

According to another aspect of the embodiments of the present disclosure, a terminal is further provided, including memory and a processor, where a plurality of computer programs are stored in the memory, and the processor is configured to execute the computer programs to perform the aforementioned method for adjusting attributes of an object according to the embodiments of the present disclosure.

In the embodiments of the present disclosure, a terminal displays target prompt information in a target interface of a client as a target scene is run on the client, the target prompt information being used for prompting the adjustment of the attributes of a virtual control object controlled by a player in the target scene; the terminal determines, according to preset configuration information of the target scene, an adjustment mode of performing adjustment; and the terminal automatically adjusts the attributes of the virtual control object in a case that the determined adjustment mode is an automatic adjustment mode. That is, the target prompt information displayed in the target interface of the client is used to prompt the adjustment of the attributes of the virtual control object controlled by the player in the target scene, and in a case that the adjustment mode determined according to the preset configuration information of the target scene is an automatic adjustment mode, the attributes of the virtual control object are automatically adjusted, so that different players are prevented from autonomously adjusting the attributes of the virtual control object, to achieve the technical effect of making it more flexible to adjust the attributes of the virtual control object, thereby solving the technical problem that it is insufficiently flexible to adjust the attributes of a virtual control object in the related art.

BRIEF DESCRIPTION OF THE DRAWINGS

The accompanying drawings described herein are intended to provide a further understanding of the embodiments of the present disclosure and constitute a part of this application. The exemplary embodiments of the present disclosure and description thereof are intended to explain the present disclosure, and not to constitute an improper limitation on the present disclosure. In the accompanying drawings.

DESCRIPTION OF EMBODIMENTS

To make persons skilled in the art understand the solutions in the present disclosure better, the following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure shall fall within the protection scope of the present disclosure.

The terms such as "first" and "second" in this specification, the claims, and the foregoing accompanying drawings of the present disclosure are intended to distinguish between similar objects rather than describe a particular sequence or a chronological order. It is understood that the data termed in such a way are interchangeable in proper circumstances, so that the embodiments of the present disclosure described herein can be implemented in orders except the order illustrated or described herein. In addition, the terms "include", "comprise" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

According to an aspect of the embodiments of the present disclosure, an embodiment of a method for adjusting attributes of an object is provided.

Figure 1:
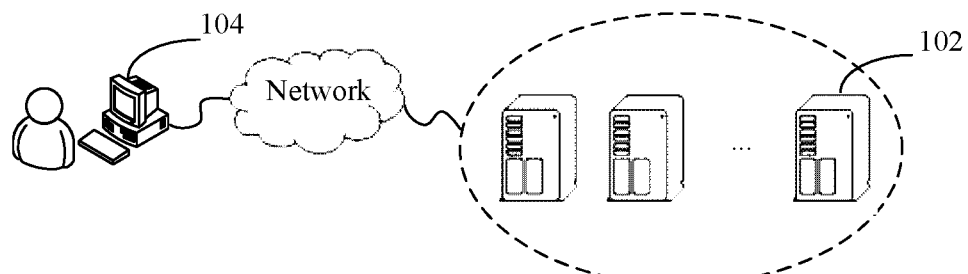
FIG. 1 is a schematic diagram of a hardware environment of a method for adjusting attributes of an object according to an embodiment of the present disclosure.

Optionally, in this embodiment, the foregoing method for adjusting attributes of an object may be applied to a hardware environment that is shown in FIG. 1 and is formed by servers 102 and a terminal 104. FIG. 1 is a schematic diagram of a hardware environment of a method for adjusting attributes of an object according to an embodiment of the present disclosure. As shown in FIG. 1, the servers 102 are connected to the terminal 104 by a network. The foregoing network includes, but is not limited to, a wide area network (WAN), a metropolitan area network (MAN) or a local area network (LAN). The terminal 104 is not limited to a personal computer (PC), a mobile phone, a tablet computer, and the like. The method for adjusting attributes of an object in this embodiment of the present disclosure may be performed by the servers 102 or may be performed by the terminal 104 or may be jointly performed by the servers 102 and the terminal 104. The method for adjusting attributes of an object performed by the terminal 104 in this embodiment of the present disclosure may be alternatively performed by a client installed on the terminal.

Figure 2:
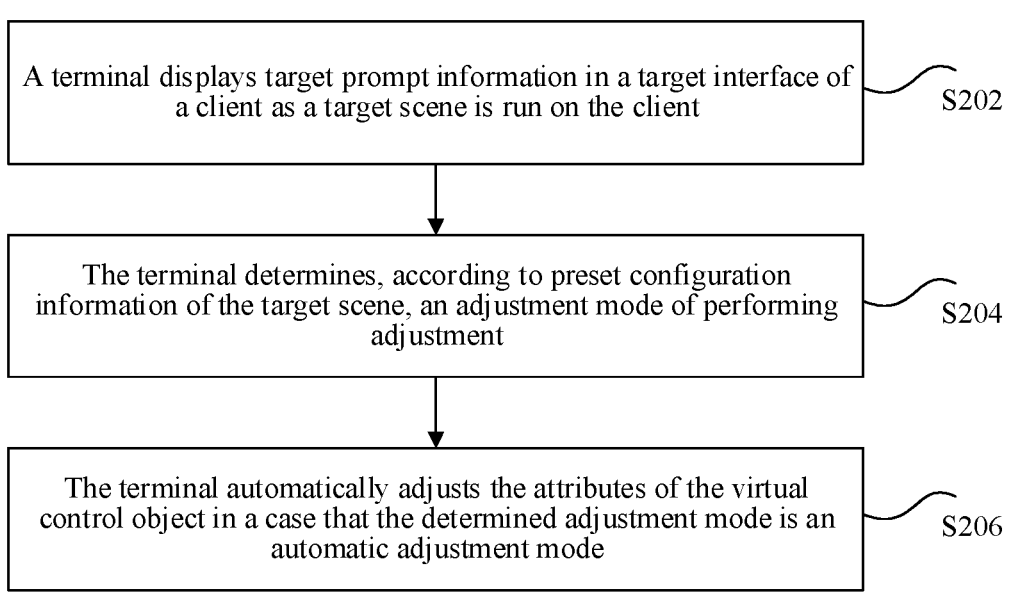
FIG. 2 is a flowchart of a method for adjusting attributes of an object according to an embodiment of the present disclosure.

FIG. 2 is a flowchart of a method for adjusting attributes of an object according to an embodiment of the present disclosure. As shown in FIG. 2, the method may include the following steps:

Step S202: A terminal displays target prompt information in a target interface of a client as a target scene is run on the client.

In the technical solution provided in step S202 in this application, the target prompt information is used for prompting the adjustment of the attributes of a virtual control object controlled by a player in the target scene.

In this embodiment, the client may be a client of a game and is provided with a target interface. The target interface may be a game interface. The game may be a multiplayer online battle arena (MOBA) game. The game may be any one of all types of MOBA games or may be a MOBA game using a fixed scene. The target scene is run on the client or a round of game may be run on the client. When the virtual control object controlled by the player just enters the target scene, the attributes of the virtual control object need to be adjusted. Because players have significantly different levels of skill, all players do not know about attribute adjustment and related detailed rules of attribute adjustment. In this embodiment, the target prompt information displayed in the target interface of the client is used to prompt the adjustment of the attributes of the virtual control object controlled by the player in the target scene.

The attributes in this embodiment are the main representation manner of the virtual control object in the target scene. The attributes may be the skills of the virtual control object, and the ability of the virtual control object can be enhanced by leveling up the skills. The virtual control object is a character controlled by the player in a round of game, for example, a hero character.

As the target scene is run on the terminal, the terminal displays target prompt information in the target interface of the client. The target prompt information is used for prompting the adjustment of the attributes of the virtual control object controlled by the player in the target scene. The target prompt information may be information about the familiarity with the game determined by the player, so as to adjust the attributes of the virtual control object according to the familiarity. For example, prompt information such as "I am a beginner", "I play games", and "I am an expert" is displayed in the game interface. "I am a beginner" is determined by a player who is completely or almost new to games. "I play games" is determined by a player who has experienced similar types of games but is not an expert. "I am an expert" is determined by a player who is quite familiar with games. Optionally, after reading the information of "I am a beginner", "I play games", and "I am an expert", the player may clearly know that the attributes of the virtual control object need to be adjusted, to select the information corresponding to the player, so as to adjust the attributes of the virtual control object.

Optionally, the target prompt information in this embodiment may be text information, icon information or the like. This is not limited herein.

Step S204: The terminal determines, according to preset configuration information of the target scene, an adjustment mode of performing adjustment.

In the technical solution provided in the foregoing step S204 of this application, the adjustment mode of adjusting the attributes of the virtual control object by the terminal may be determined by using the preset configuration information of the target scene. For example, the level up mode of leveling up the skills of the virtual control object may be determined by using preset configuration information in a round of game.

The configuration information of the target scene in this embodiment may be set by the familiarity with the player with the game. For example, for a player of "I am a beginner", the preset configuration information in a round of game is used for indicating that the adjustment mode is a mode that the system directly automatically adjusts the attributes of the virtual control object. For a player of "I play games", the preset configuration information in a round of game is used for indicating that the adjustment mode is a mode that the attributes of the virtual control object are automatically adjusted if the player does not adjust the attributes of the virtual control object after a wait of a period of time. For a player of "I am an expert", the preset configuration information in a round of game may be a mode that the player adjusts the attributes of the virtual control object.

Step S206: The terminal automatically adjusts the attributes of the virtual control object in a case that the determined adjustment mode is an automatic adjustment mode.

In the technical solution provided in the foregoing step S206 of this application, when determining, according to the preset configuration information of the target scene, that the adjustment mode of performing adjustment is an automatic adjustment mode, the terminal automatically adjusts the attributes of the virtual control object. That is, a player does not need to adjust the attributes of the virtual control object, and the attributes of the virtual control object are automatically adjusted. For example, for a player of "I am a beginner", the preset configuration information in a round of game is used for indicating that the adjustment mode is a mode that the system directly automatically adjusts the attributes of the virtual control object, and the terminal automatically adjusts the attributes of the virtual control object. Alternatively, for a player of "I play games", the preset configuration information in a round of game is used for indicating that the adjustment mode is a mode that the attributes of the virtual control object are automatically adjusted if the player does not adjust the attributes of the virtual control object after a wait of a period of time. If the player does not adjust the attributes of the virtual control object after a wait of a period of time, the terminal automatically adjusts the attributes of the virtual control object. In this way, the player does not need to adjust the attributes of the virtual control object autonomously. Therefore, there is no knowledge burden for an inexperienced player who does not know about attribute adjustment and related detailed rules of attribute adjustment. An inexperienced player only needs to acquire less gaming information when adjusting the attributes of a virtual control object, so that a user is allowed to focus on the core combat experience of a game. In addition, a skilled player is provided with a mode of controlling the behavior in a game, it becomes more flexible to adjust the attributes of a virtual control object, and eventually most players can immerse themselves in a game, thereby enhancing the gaming experience of players.

By means of the foregoing steps S202 to S206, a terminal displays target prompt information in a target interface of a client as a target scene is run on the client, the target prompt information being used for prompting the adjustment of the attributes of a virtual control object controlled by a player in the target scene; the terminal determines, according to preset configuration information of the target scene, an adjustment mode of performing adjustment; and the terminal automatically adjusts the attributes of the virtual control object in a case that the determined adjustment mode is an automatic adjustment mode. That is, the target prompt information displayed in the target interface of the client is used to prompt the adjustment of the attributes of the virtual control object controlled by the player in the target scene, and in a case that the adjustment mode determined according to the preset configuration information of the target scene is an automatic adjustment mode, the attributes of the virtual control object are automatically adjusted, so that different players are prevented from autonomously adjusting the attributes of the virtual control object, to achieve the technical effect of making it more flexible to adjust the attributes of the virtual control object, thereby solving the technical problem that it is insufficiently flexible to adjust the attributes of a virtual control object in the related art.

As an optional implementation, in step S206, the automatically adjusting, by the terminal, the attributes of the virtual control object in a case that the determined adjustment mode is an automatic adjustment mode includes: automatically adjusting, by the terminal, the attributes of the virtual control object as soon as the target prompt information is displayed in a case that the determined adjustment mode is a first automatic adjustment mode, where the automatic adjustment mode includes the first automatic adjustment mode; or automatically adjusting, by the terminal, the attributes of the virtual control object after a first predetermined time length is delayed starting from the display of the target prompt information in a case that the determined adjustment mode is a second automatic adjustment mode, where the automatic adjustment mode includes the second automatic adjustment mode.

In this embodiment, the automatic adjustment mode includes the first automatic adjustment mode. The first automatic adjustment mode is used for directly automatically adjusting the attributes of the virtual control object, and may be an attribute adjustment mode of the virtual control object for a player of "I am a beginner". For example, the first automatic adjustment mode is a fully-automatic skill level up mode. The system automatically helps the player of "I am a beginner" to level up the skills of the virtual control object.

Optionally, when the determined adjustment mode is the first automatic adjustment mode, the terminal may automatically adjust the attributes of the virtual control object as soon as the target prompt information is displayed. For example, in a case that the terminal determines that the adjustment mode is the first automatic adjustment mode, the attributes of the virtual control object are automatically adjusted as soon as the target prompt information of "I am a beginner" determined by the player is displayed. Optionally, in the first automatic adjustment mode, when there is a skill point, the terminal can directly determine which skill of the virtual control object is to be leveled up, so as to level up the skill of the virtual control object that needs to be leveled up. In this way, a player does not need to autonomously adjust the attributes of the virtual control object according to adjustment rules of attributes. The skill level up of the virtual control object requires a skill point. Each time the virtual control object is leveled up by one level, one skill point is acquired, and one skill point can be used for leveling up a skill once.

Optionally, the automatic adjustment mode in this embodiment includes a second automatic adjustment mode. The second automatic adjustment mode may be a delayed skill level up mode, which is used for the terminal to automatically adjust the attributes of the virtual control object after a first predetermined time length is delayed starting from the display of the target prompt information, and the delayed skill level up mode may be an attribute adjustment mode of the virtual control object for a player of "I play games". For example, after the first predetermined time length is delayed since the terminal displays the information of "I play games" determined by the player, the attributes of the virtual control object are then automatically adjusted. The first predetermined time length may be set, for example, 20 s, which is not limited herein. Optionally, after a wait of the first predetermined time length, if there is a skill point, which skill is to be leveled up is determined, to level up the determined skill to be leveled up of the virtual control object, so that a player does not need to adjust the attributes of the virtual control object according to the adjustment rules of attributes.

As an optional implementation, the automatically adjusting, by the terminal, the attributes of the virtual control object after a first predetermined time length is delayed starting from the display of the target prompt information includes: automatically adjusting, by the terminal, the attributes of the virtual control object after the first predetermined time length is delayed starting from the display of the target prompt information in a case that the terminal does not receive a manual adjustment instruction within the first predetermined time length, where the manual adjustment instruction is used for adjusting the attributes of the virtual control object.

In this embodiment, the manual adjustment instruction may be an adjustment instruction triggered when the player uses the terminal to autonomously adjust the attributes of the virtual control object. In a case that the terminal does not receive the manual adjustment instruction within the first predetermined time length, that is, the player does not autonomously adjust the attributes of the virtual control object within the first predetermined time length, the terminal automatically adjusts the attributes of the virtual control object. Therefore, the attributes of the virtual control object are automatically adjusted. For example, for a player of "I play games", the preset configuration information in a round of game is used for indicating that the adjustment mode is a mode that the attributes of the virtual control object are automatically adjusted in the case that after a wait of the first predetermined time length, no manual adjustment instruction is received within the first predetermined time length.

Optionally, in this embodiment, if the player is "I am an expert", the attributes of the virtual control object are adjusted by using the manual adjustment instruction. Therefore, appropriate adjustment modes are used for virtual control objects of players with different levels of skill, and it is more flexible to adjust the virtual control object.

As an optional implementation, before the displaying, by a terminal, target prompt information in a target interface of a client in step S202, the method further includes: acquiring, by the terminal, operation information of a completed target scene of the player; and setting, by the terminal, the configuration information to indicate that the adjustment mode is the automatic adjustment mode in a case that the operation information indicates first target status information, where the first target status information is used for indicating that all the attributes of the virtual control object in the completed target scene are not adjusted within a second predetermined time length.

In this embodiment, before the terminal displays the target prompt information in the target interface of the client, the terminal may acquire the operation information of the completed target scene of the player. For example, operation information of a game of one or more completed rounds of game of the player is acquired and may be used for indicating the operation behavior of the player in the game, and the adjustment mode of adjusting the attributes of the virtual control object is determined according to the operation information.

The first target status information in this embodiment is used for indicating that in the completed target scene, all the attributes of the virtual control object are not adjusted within the second predetermined time length. For example, the first target status information is used for indicating that in one or more completed rounds of game, all the attributes of the virtual control object are not adjusted within the second predetermined time length, where the second predetermined time length may be a preset time within which the attributes of the virtual control object need to be adjusted and may be less than the time of the completed target scene, and for example, is less than the time of the one or more completed rounds of game. When the operation information indicates the first target status information, the terminal sets the configuration information to indicate that the adjustment mode is the automatic adjustment mode, which may be the first automatic adjustment mode or the second automatic adjustment mode.

For example, the automatic adjustment mode includes a "fully-automatic skill level up" mode and a "delayed automatic skill level up" mode. During game playing, within the second predetermined time length, if the player levels up skills using fewer than 30% of skill points, the adjustment mode is determined as the "fully-automatic skill level up" mode. During game playing, within the second predetermined time length, if the player levels up skills using 30% to 70% of skill points, the adjustment mode is determined as the "delayed automatic skill level up" mode.

As an optional implementation, the setting, by the terminal, the configuration information to indicate that the adjustment mode is the automatic adjustment mode in a case that the operation information indicates first target status information includes: setting, by the terminal, the configuration information to indicate that the adjustment mode is the first automatic adjustment mode in a case that the operation information indicates first sub-target status information, where the first automatic adjustment mode is used for instructing to automatically adjust the attributes of the virtual control object as soon as the target prompt information is displayed, the first target status information includes the first sub-target status information, the first sub-target status information is used for indicating that an adjustment ratio of the attributes is less than a first predetermined threshold, and the adjustment ratio is a ratio of the number of times of adjusting the attributes of the virtual control object within the second predetermined time length in the completed target scene to the total number of times of adjusting the attributes of the virtual control object in the completed target scene.

In this embodiment, the first sub-target status information is used for indicating that the adjustment ratio of the attributes is less than a first predetermined threshold, the first predetermined threshold may be 30%, and the adjustment ratio is a ratio of the number of times of adjusting the attributes of the virtual control object within the second predetermined time length in the completed target scene to the total number of times of adjusting the attributes of the virtual control object in the completed target scene. For example, the number of times of adjusting the attributes of the virtual control object within the second predetermined time length is 2, the total number of times of adjusting the attributes of the virtual control object in one or more completed rounds of game 10, and the ratio is 20% and is less than the first predetermined threshold of 30%. When the operation information indicates the first sub-target status information, the terminal sets the configuration information to indicate that the adjustment mode is the first automatic adjustment mode. For example, during game playing, the player autonomously levels up skills in time using fewer than 30% of skill points, the configuration information is set to indicate that the adjustment mode is the "fully-automatic skill level up" mode, and the current adjustment mode can be adjusted from a "player autonomous skill level up" mode to the "fully-automatic skill level up" mode.

As an optional implementation, the setting, by the terminal, the configuration information to indicate that the adjustment mode is the automatic adjustment mode in a case that the operation information indicates first target status information includes: setting, by the terminal, the configuration information to indicate that the adjustment mode is the second automatic adjustment mode in a case that the operation information indicates second sub-target status information, where the second automatic adjustment mode is used for instructing to automatically adjust the attributes of the virtual control object after a first predetermined time length is delayed starting from the display of the target prompt information, the first target status information includes the second sub-target status information, the second sub-target status information is used for indicating that an adjustment ratio of the attributes is greater than or equal to the first predetermined threshold and less than a second predetermined threshold, and the adjustment ratio is a ratio of the number of times of adjusting the attributes of the virtual control object within the second predetermined time length in the completed target scene to the total number of times of adjusting the attributes of the virtual control object in the completed target scene.

In this embodiment, the first sub-target status information is used for indicating that the adjustment ratio of the attributes is greater than or equal to the first predetermined threshold and less than or equal to a second predetermined threshold. For example, the first predetermined threshold may be 30%, and the second predetermined threshold may be 70%, and the adjustment ratio is a ratio of the number of times of adjusting the attributes of the virtual control object within the second predetermined time length in the completed target scene to the total number of times of adjusting the attributes of the virtual control object in the completed target scene. For example, the number of times of adjusting the attributes of the virtual control object within the second predetermined time length is 6, the total number of times of adjusting the attributes of the virtual control object in one or more completed rounds of game is 10, and the ratio is 60% and is greater than the first predetermined threshold 30% and less than the second predetermined threshold 70%. In a case that the operation information indicates the second sub-target status information, the terminal sets the configuration information to indicate that the adjustment mode is the second automatic adjustment mode. For example, during game playing, the player autonomously levels up skills in time using the first predetermined threshold of 30% to the second predetermined threshold of 70% of skill points, the configuration information is set to indicate that the adjustment mode is the "delayed automatic skill level up" mode, and the current "player autonomous skill level up" mode can be adjusted to the "delayed automatic skill level up" mode.

As an optional implementation, the setting, by the terminal, the configuration information to indicate that the adjustment mode is the automatic adjustment mode in a case that the operation information indicates first target status information includes: adjusting, by the terminal, the adjustment mode from a current autonomous adjustment mode to the automatic adjustment mode in a case that the operation information indicates the first target status information, and setting the configuration information to indicate that the adjustment mode is the automatic adjustment mode, where the autonomous adjustment mode is used for instructing the player to adjust the attributes of the virtual control object.

In this embodiment, the current mode of adjusting the attributes of the virtual control object is the autonomous adjustment mode. The autonomous adjustment mode may be used for instructing the player to adjust the attributes of the virtual control object. The attributes of the virtual control object may be adjusted by using the manual adjustment instruction. Before displaying the target prompt information in the target interface of the client, the terminal can acquire the operation information of the completed target scene of the player. For example, operation information of a game of one or more completed rounds of game of the player is acquired. In a case that the operation information indicates the first target status information, that is, in the completed target scene, all the attributes of the virtual control object are not adjusted within the second predetermined time length, the mode of adjusting the attributes of the virtual control object is adjusted from the current autonomous adjustment mode to the automatic adjustment mode, and the configuration information is set to indicate that the adjustment mode is the automatic adjustment mode.

For example, the current autonomous adjustment mode is the "player autonomous skill level up" mode. The automatic adjustment mode includes the "fully-automatic skill level up" mode and the "delayed automatic skill level up" mode. During game playing, if the player autonomously levels up skills in time using fewer than 30% of skill points, the "player autonomous skill level up" mode is adjusted to the "fully-automatic skill level up" mode. During game playing, if the player autonomously levels up skills in time using 30% to 70% of skill points, the "player autonomous skill level up" mode is adjusted to the "delayed automatic skill level up" mode, to automatically change the adjustment mode, so that it is more flexible to adjust the attributes of the virtual control object.

As an optional implementation, after the acquiring, by the terminal, operation information of a completed target scene of the player, the method further includes: keeping, by the terminal, the current autonomous adjustment mode as the adjustment mode in a case that the operation information indicates the second target status information, and keeping the configuration information to indicate that the adjustment mode is the autonomous adjustment mode, where the second target status information is used for indicating that the adjustment ratio of the attributes is greater than the second predetermined threshold, the adjustment ratio is a ratio of the number of times of adjusting the attributes of the virtual control object within the second predetermined time length in the completed target scene to the total number of times of adjusting the attributes of the virtual control object in the completed target scene, and the autonomous adjustment mode is used for instructing the player to adjust the attributes of the virtual control object.

In this embodiment, the second target status information is used for indicating that the adjustment ratio of the attributes is greater than the second predetermined threshold. The second predetermined threshold may be 70%. The adjustment ratio is a ratio of the number of times of adjusting the attributes of the virtual control object within the second predetermined time length in the completed target scene to the total number of times of adjusting the attributes of the virtual control object in the completed target scene. For example, the number of times of adjusting the attributes of the virtual control object within the second predetermined time length in one or more completed rounds of game is 8, the total number of times of adjusting the attributes of the virtual control object in the one or more completed rounds of game is 10, and the ratio is 80% and is greater than the second predetermined threshold 70%. In this case, in a case that the operation information indicates the second target status information, the terminal keeps the current autonomous adjustment mode as the adjustment mode, and keeps the configuration information to indicate that the adjustment mode is the autonomous adjustment mode.

For example, the autonomous adjustment mode is the "player autonomous skill level up" mode. During game playing, if the player autonomously levels up skills in time using more than the second predetermined threshold 70% of skill points, the skill level up mode is not adjusted and the configuration information is kept as the "player autonomous skill level up" mode As an optional implementation, before the displaying, by a terminal, target prompt information in a target interface of a client in step S202, the method further includes: acquiring, by the terminal, operation information of a completed target scene of the player; setting, by the terminal, the configuration information to indicate that the adjustment mode is the second automatic adjustment mode in a case that the operation information indicates third target status information, where the third target status information is used for indicating that the adjustment ratio of the attributes is greater than or equal to a third predetermined threshold and less than or equal to a fourth predetermined threshold, and the adjustment ratio is a ratio of the number of times of adjusting the attributes of the virtual control object within the second predetermined time length in the completed target scene to the total number of times of adjusting the attributes of the virtual control object in the completed target scene.

In this embodiment, the third target status information is used for indicating that the adjustment ratio of the attributes is greater than or equal to a third predetermined threshold and less than or equal to a fourth predetermined threshold. For example, the third predetermined threshold is 0, the fourth predetermined threshold is 90%, and the adjustment ratio is a ratio of the number of times of adjusting the attributes of the virtual control object within the second predetermined time length in the completed target scene to the total number of times of adjusting the attributes of the virtual control object in the completed target scene. For example, the number of times of adjusting the attributes of the virtual control object within the second predetermined time length in one or more completed rounds of game is 5, the total number of times of adjusting the attributes of the virtual control object in the one or more completed rounds of game is 10, and the ratio is 50% and is greater than or equal to the third predetermined threshold of 0 and less than or equal to the fourth predetermined threshold of 90%. When the acquired operation information of the completed target scene of the player indicates the third target status information, the configuration information is set to indicate that the adjustment mode is the second automatic adjustment mode.

For example, the second automatic adjustment mode is to keep the "delayed automatic level up mode". During game playing, if the player autonomously levels up skills in time using the third predetermined threshold of 0% to the fourth predetermined threshold of 90% of skill points, and the configuration information is set to the "delayed automatic skill level up" mode.

As an optional implementation, the setting, by the terminal, the configuration information to indicate that the adjustment mode is the second automatic adjustment mode in a case that the operation information indicates third target status information includes: keeping, by the terminal, the adjustment mode as the current second automatic adjustment mode in a case that the operation information indicates the third target status information, and keeping the configuration information to indicate that the adjustment mode is the second automatic adjustment mode.

In this embodiment, the current mode of adjusting the attributes of the virtual control object is the second automatic adjustment mode. Before the displaying, by a terminal, target prompt information in a target interface of a client, the terminal can acquire the operation information of the completed target scene of the player, for example, operation information of a game of one or more completed rounds of game of the player is acquired. In a case that the operation information indicates the third target status information, the attributes of the virtual control object are kept as the second automatic adjustment mode, and the configuration information is kept for indicating that the adjustment mode is the second automatic adjustment mode. For example, the current adjustment mode is the "delayed automatic skill level up" mode. During game playing, if the player autonomously levels up skills in time using 0% to 90% of skill points, and the adjustment mode is kept as the current "delayed automatic skill level up" mode.

As an optional implementation, after the acquiring, by the terminal, operation information of a completed target scene of the player, the method further includes: setting, by the terminal, the configuration information to indicate that the adjustment mode is an autonomous adjustment mode in a case that the operation information indicates fourth target status information, where the fourth target status information is used for indicating that the adjustment ratio of the attributes is greater than the fourth predetermined threshold, and the autonomous adjustment mode is used for instructing the player to adjust the attributes of the virtual control object.

In this embodiment, the fourth target status information is used for indicating that the adjustment ratio of the attributes is greater than the fourth predetermined threshold of 90%. For example, after acquiring the operation information of the completed target scene of the player, for example, after acquiring one or more completed rounds of games of the player, the terminal sets the configuration information to indicate that the adjustment mode is the autonomous adjustment mode in a case that the operation information indicates the fourth target status information. The autonomous adjustment mode may be a "player autonomous skill level up" mode. For example, when the current adjustment mode of adjusting the attributes of the virtual control object is the second automatic adjustment mode, in a case that the operation information indicates the fourth target status information, the terminal changes the second automatic adjustment mode to the autonomous adjustment mode, for example, changes the "delayed automatic skill level up" mode to the "player autonomous skill level up" mode, thereby automatically changing the adjustment mode, so that it is more flexible to t adjust the attributes of the virtual control object.

Optionally, in this embodiment, the mode of adjusting the attributes of the virtual control object may also be set in a setting panel by manual adjustment.

Optionally, in this embodiment, during the adjustment of the attributes of the virtual control object, for both automatic adjustment and manual adjustment, the attribute adjustment mode is solely adjusted by the client and is stored locally by the client after the adjustment but does not need to be reported to a server.

As an optional implementation, the automatically adjusting, by the terminal, the attributes of the virtual control object in a case that the determined adjustment mode is an automatic adjustment mode includes at least one of the following steps: determining, by the terminal, an attribute that the virtual control object does not have in the target scene as an attribute that needs to be automatically adjusted of the virtual control object; determining, by the terminal, an attribute used for producing a target operation result for the virtual control object in the target scene as an attribute that needs to be automatically adjusted of the virtual control object; and determining, by the terminal, an attribute corresponding to a profession of the virtual control object in the target scene as an attribute that needs to be automatically adjusted of the virtual control object.

In this embodiment, the attributes of the virtual control object have corresponding tags according to the functions, such as, a damage tag, a defense tag, a displacement tag, and a control tag for the skills. When the terminal determines that the adjustment mode is an automatic adjustment mode, for example, when the determined adjustment mode is the first automatic adjustment mode or the second automatic adjustment mode, the terminal may determine an attribute that needs to be leveled up of the virtual control object, which can be performed by a corresponding client. The terminal can determine an attribute that the virtual control object does not have in the target scene as an attribute that needs to be automatically adjusted of the virtual control object. For example, the possession of a skill has priority over the enhancement of a skill. Therefore, it is more preferential to level up an unacquired skill, and an attribute that the virtual control object does not have in a round of game is determined as an attribute that needs to be automatically adjusted of the virtual control object.

The terminal can determine an attribute used for producing a target operation result for the virtual control object in the target scene as an attribute that needs to be automatically adjusted of the virtual control object. For example, the benefit of an ultimate skill is higher than that of another skill, so it is more preferential to level up an ultimate skill. An attribute for producing a target operation result for the virtual control object in a round of game is determined as an attribute that needs to be automatically adjusted of the virtual control object.

The terminal can determine an attribute corresponding to a profession of the virtual control object in the target scene as an attribute that needs to be automatically adjusted of the virtual control object. Optionally, the benefit of leveling up minor skills varies for different professions. An attribute corresponding to a profession of the virtual control object in a round of game is determined as an attribute that needs to be automatically adjusted of the virtual control object. The orders of priority of leveling up minor skills are as follows. For a wizard or an assassin, the order of priority is a damage skill >a displacement skill >a control skill >a defense skill. For a warrior, the order of priority is a damage skill >a control skill >a defense skill >displacement skill. For a tank, the order of priority is a control skill >a defense skill >damage skill >displacement skill. For a support character, the order of priority is a control skill >a damage skill >a displacement skill >a defense skill.

Optionally, in this embodiment, for operational skills that the virtual control object does not have, an operational skill used for producing a target operation result for a virtual control object in a virtual scene is determined as a target operational skill that needs to be leveled up.

Optionally, for a virtual control object in a virtual scene, if there is no operational skill for producing a target operation result for the virtual control object in the virtual scene, a skill corresponding to a profession of the virtual control object in the virtual scene is determined as a target operational skill that needs to be leveled up.

Optionally, in a case that no operational skill that the virtual control object does not have exists in the virtual scene, an operational skill that the virtual control object has in the virtual scene is determined as a target operational skill that needs to be leveled up.

Optionally, in a frame synchronization technology, a server collects operation execution requests initiated by all clients in a single round within a fixed frame clock, summarizes the operation execution requests, and delivers the summarized operation execution requests to all the clients in the single round, and each client independently operates a result according to the summarized operation execution requests. In this embodiment, a target request may be sent to the server, the target request is used for requesting the server to acquire an operation instruction for adjusting the attributes of the virtual control object, and the operation instruction delivered by the server in response to the target request is received to adjust the attributes of the virtual control object in a game.

In this embodiment, different modes of adjusting the attributes of a virtual control object may be provided to players with different levels of skill, and an inexperienced player only needs to acquire less gaming information when adjusting the attributes of a virtual control object, so that a user is allowed to focus on the core combat experience of a game. In addition, a skilled player is provided with a mode of controlling the behavior in a game, it becomes more flexible to adjust the attributes of a virtual control object, and eventually most players can immerse themselves in a game, thereby enhancing the gaming experience of players.

The technical solutions in the present disclosure are described below with reference to preferred embodiments. Specifically, skills are as used as an example of the attributes of the virtual control object for description.

Because players of a terminal game have significantly different levels of skill, all players do not know about skill level up and related detailed rules, and skill level up is the main mode of enhancing the ability of a virtual control object. Therefore, in this embodiment, intelligent skill level up modes are provided according to levels of skill of players and game scenes, and are dynamically adjusted based on the actual gaming behavior of the players.

In a multiplayer battle game, a skill is a main representation manner of an attribute of a virtual control object. A virtual control object cannot use a skill when a game is just entered but can use only a skill after the skill is leveled up, and the skill can be leveled up again to be enhanced. A skill point is required to level up a skill. Each time the virtual control object is leveled up by one level, one skill point is acquired, and one skill point can be used for leveling up a skill once. In addition, skill level up is also limited by the level.

Figure 3:
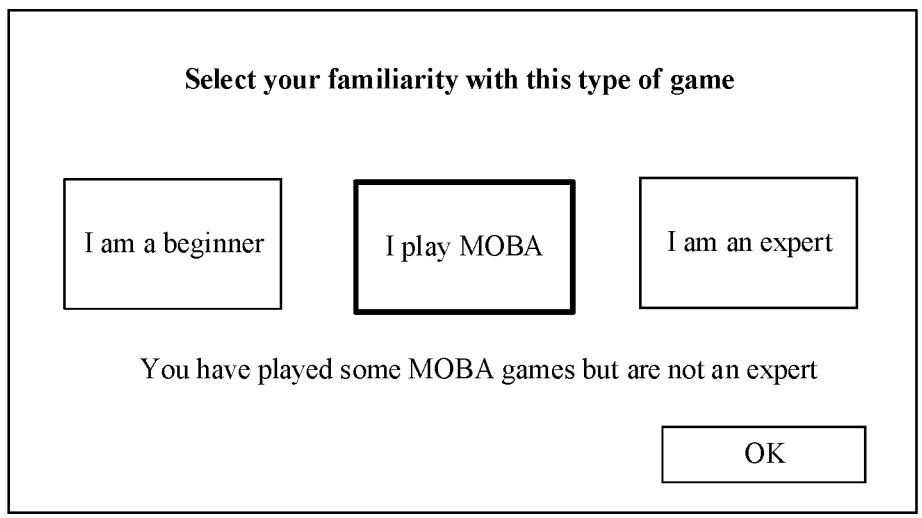
FIG. 3 is a schematic diagram of determining a player type according to an embodiment of the present disclosure.

FIG. 3 is a schematic diagram of determining a player type according to an embodiment of the present disclosure. As shown in FIG. 3, when a player enters a game for the first time, the player is provided with options for selecting a level of gaming skill of the player. Three options are provided: "I am a beginner", "I play MOBA", and "I am an expert". According to the level of gaming skill, different skill level up modes of the players are determined.

"I am a beginner" is a player who is completely or almost new to MOBA games. For such a player, the "fully-automatic skill level up" mode is used. That is, the system helps to level up skills as soon as the player is leveled up. The method for fully-automatic skill level up in this embodiment is described below.

Figure 4:
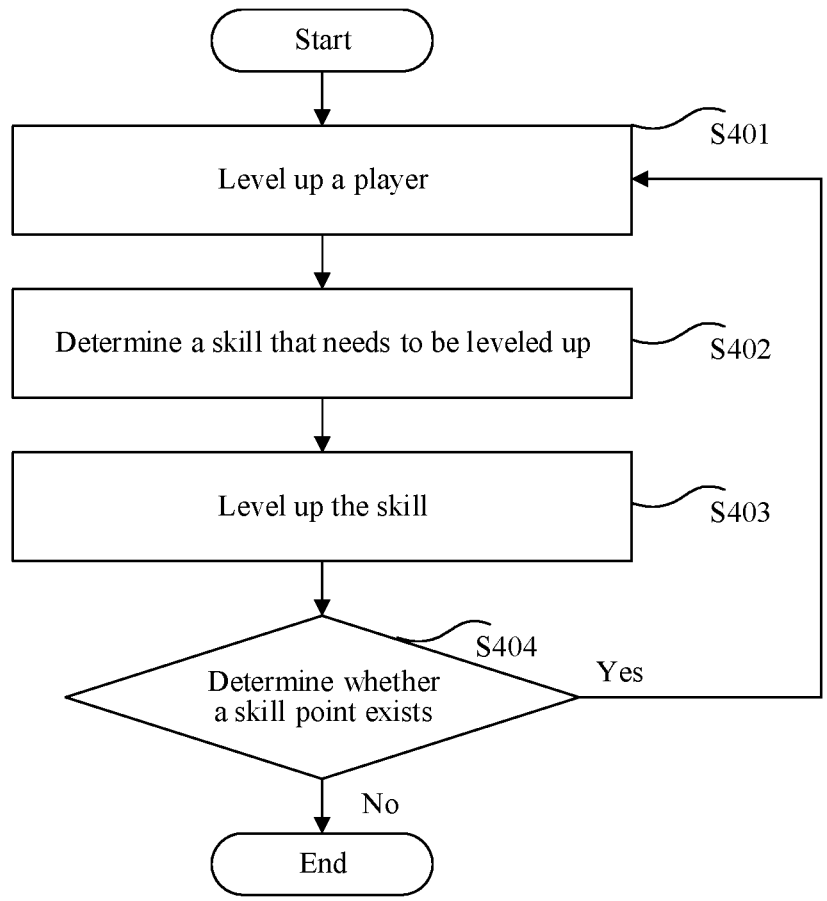
FIG. 4 is a flowchart of a method of fully-automatic skill level up according to an embodiment of the present disclosure.

FIG. 4 is a flowchart of a method for fully-automatic skill level up according to an embodiment of the present disclosure. As shown in FIG. 4, the method includes the following steps:

Step S401: Level up a player.
Step S402: Determine a skill that needs to be leveled up.
Step S403: Level up the skill.
Step S404: Determine whether a skill point exists.

After the skill is leveled up, it is determined whether a skill point exists. If it is determined that a skill point exists, step S401 is performed. If it is determined that no skill point exists, the process is ended.

"I play MOBA" is an advanced player who has experienced similar types of games but is not an expert. For such a player, the "delayed automatic skill level up" mode is used. That is, after a player is leveled up, there is a wait of a period of time for the player to level up a skill. If the player does not level up a skill within the period of time, the system helps the player to level up the skill. The method for delayed automatic skill level up in this embodiment is described below.

Figure 5:
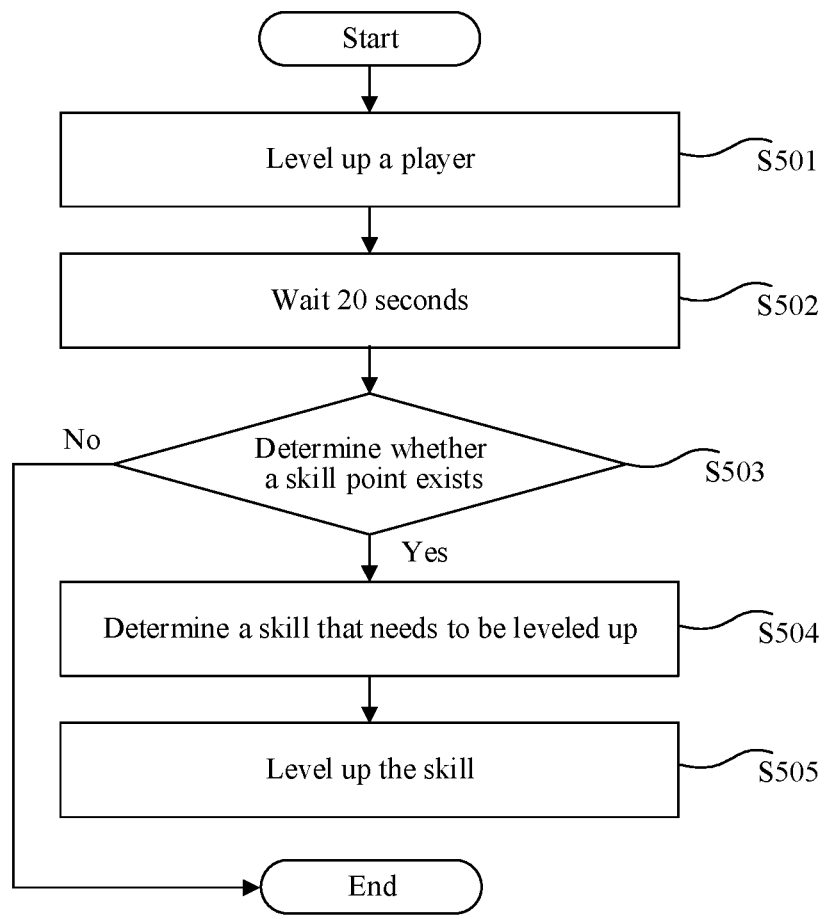
FIG. 5 is a flowchart of a method of delayed automatic skill level up according to an embodiment of the present disclosure.

FIG. 5 is a flowchart of a method for delayed automatic skill level up according to an embodiment of the present disclosure. As shown in FIG. 5, the method includes the following steps:

Step S501: Level up a player.
Step S502: Wait 20 seconds.
Step S503: Determine whether a skill point exists.

After a wait of 20 seconds, it is determined whether a skill point exists. If it is determined that a skill point exists, step S504 is performed. If it is determined that no skill point exists, the process is ended.

Step S504: Determine a skill that needs to be leveled up.

After it is determined whether a skill point exists, if it is determined that a skill point exists, the skill that needs to be leveled up is determined.

Step S505: Level up the skill.

"I am an expert" is a player who is familiar with MOBA games. For such a player, the "player autonomous skill level up" mode is used. That is, the system does not help the player to level up a skill. The player chooses to level up the skill as required.

The method for determining skill level up in a system in this embodiment is described below.

Figure 6:
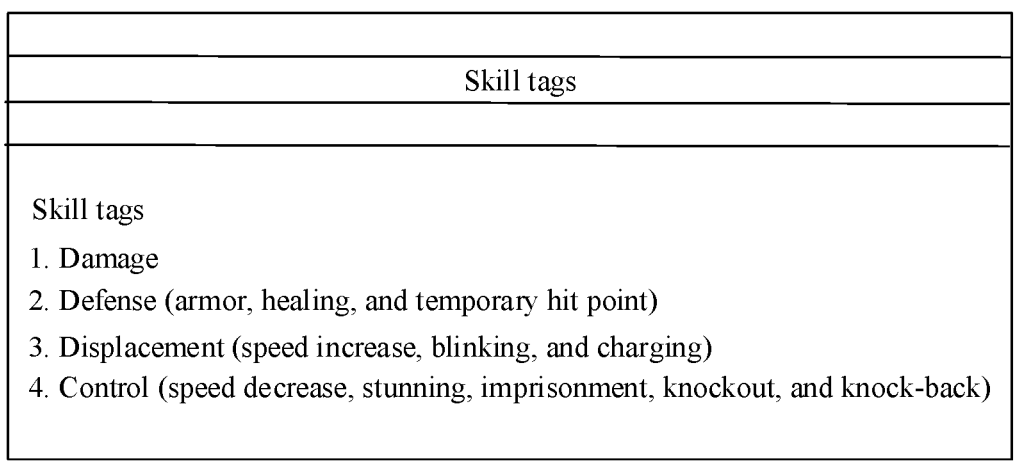
FIG. 6 is a schematic diagram of skill tags according to an embodiment of the present disclosure.

FIG. 6 is a schematic diagram of skill tags according to an embodiment of the present disclosure. As shown in FIG. 6, the skills have corresponding skill tags according to major functions thereof. The still tags are damage, defense (armor, healing, and temporary hit point), displacement (speed increase, blinking, and charging), and control (speed decrease, stunning, imprisonment, knockout, and knockback).

For levels of skill of players and skill level up in this embodiment, skill level up modes for different players in the system are described. For the "fully-automatic skill level up" mode and the "delayed automatic skill level up" mode, a determination mode of specifically selecting which skill during skill level up is as follows:

The possession of a skill has priority over the enhancement of a skill. Therefore, it is more preferential to level up an unacquired skill. The benefit of an ultimate skill is higher than that of another skill, so that it is more preferential to level up an ultimate skill. The benefit of leveling up minor skills varies for different professions. The orders of priority of leveling up minor skills are as follows: For a wizard, an assassin or an ADC, the order of priority is a damage skill >a displacement skill >a control skill >a defense skill. For a warrior, the order of priority is a damage skill >a control skill >a defense skill >displacement skill. For a tank, the order of priority is a control skill >a defense skill >a damage skill >displacement skill. For a support character, the order of priority is a control skill >a damage skill >a displacement skill >a defense skill.

The adjustment of the skill level up mode in this embodiment is described below.

The adjustment of the skill level up mode includes automatic adjustment and manual adjustment.

Automatic adjustment: after a combat is completed, the skill level up behavior of a player in the combat is determined. If the current skill level up mode does not match the behavior performance of the player, the skill level up mode is automatically changed.

Optionally, the player is currently in the "player autonomous skill level up" mode. During game playing, if the player autonomously levels up skills in time using fewer than 30% of skill points, the "player autonomous skill level up" mode is adjusted to the "fully-automatic skill level up" mode.

Optionally, during game playing, if the player autonomously levels up skills in time using 30% to 70% of skill points, the "player autonomous skill level up" mode is adjusted to the "delayed automatic skill level up" mode.

Optionally, during game playing, if the player autonomously levels up skills in time using more than 70% of skill points, the skill level up mode is not adjusted.

Optionally, the player is currently in the "delayed automatic skill level up" mode.

Optionally, during game playing, if the player autonomously levels up skills in time using 0% to 90% of skill points, the level up mode is not adjusted.

Optionally, during game playing, if the player autonomously levels up skills in time using more than 90% of skill points, the mode is adjusted to the "player autonomous skill level up" mode.

Figure 7:
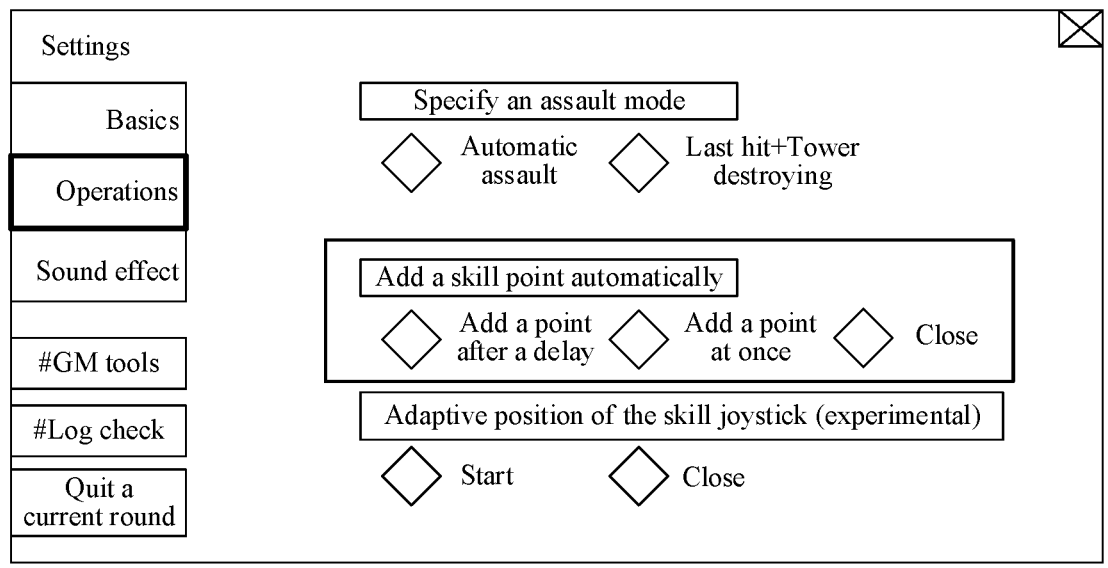
FIG. 7 is a schematic diagram of selecting an adjustment mode in a setting panel according to an embodiment of the present disclosure.

FIG. 7 is a schematic diagram of selecting an adjustment mode in a setting panel according to an embodiment of the present disclosure. As shown in FIG. 7, for manual adjustment, "Operations" may be selected in the setting panel, and one of "Add a point after a delay", "Add a point at once", and "Close" may be selected in "Add a skill point automatically" to implement the mode of adjusting the attributes of the virtual control object. The "Add a point after a delay" may be an adjustment mode of automatically leveling up a skill after a delay, "Add a point at once" may be an adjustment mode of leveling up a skill fully-automatically, and "Close" is to skip automatic adjustment.

Figure 8:
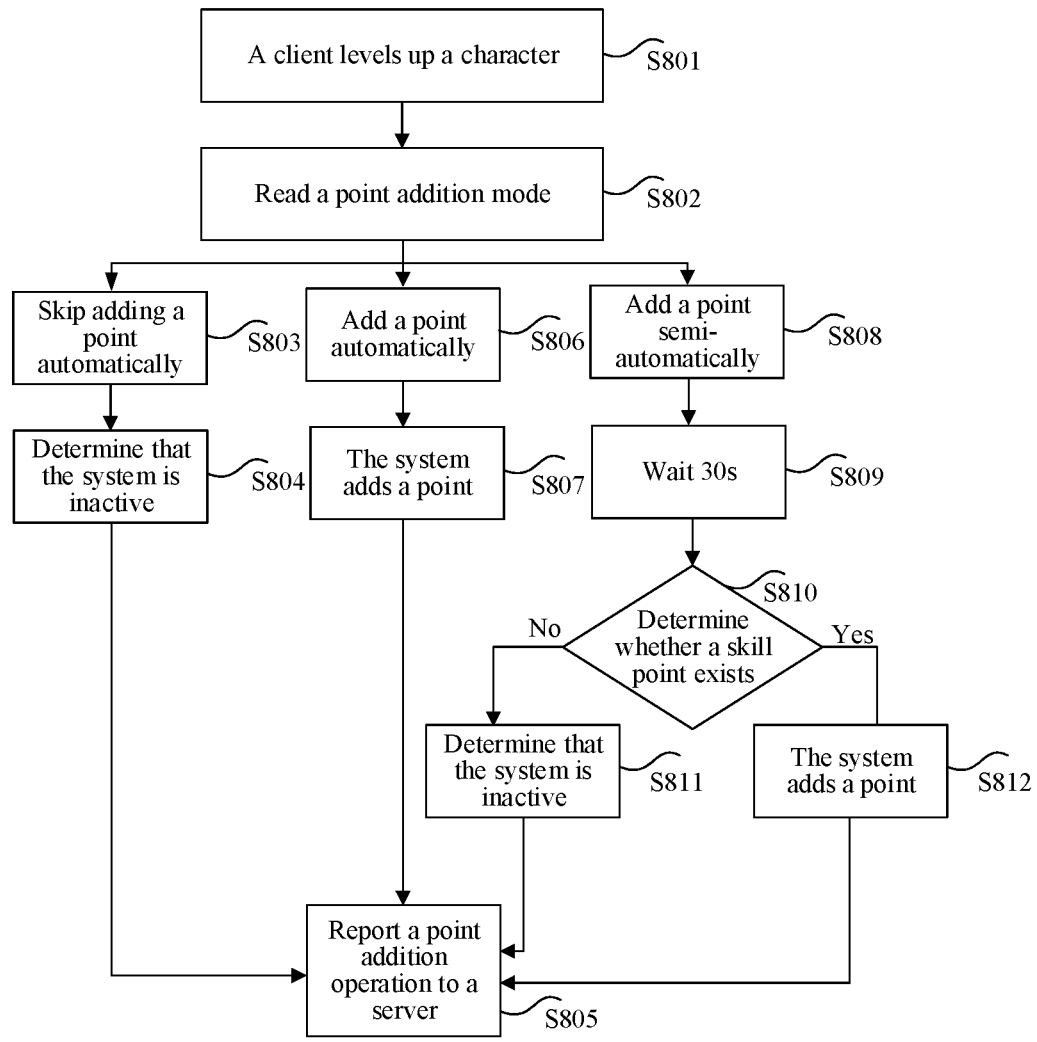
FIG. 8 is a flowchart of another method for adjusting attributes of a virtual control object according to an embodiment of the present disclosure.

FIG. 8 is a flowchart of another method for adjusting attributes of a virtual control object according to an embodiment of the present disclosure. As shown in FIG. 8, the method includes the following steps:

Step S801: A client levels up a character.

Step S802: Read a point addition mode.

Step S803: Skip adding a point automatically.

Step S804: Determine that the system is inactive.

After determining that the point addition mode is to skip adding a point automatically, the system is inactive.

Step S805: Report a point addition operation to a server.

After the system is inactive, the point addition operation is reported to the server.

Step S806: Add a point automatically.

Step S807: The system adds a point.

After the system adds a point, step S805 is performed.

Step S808: Add a point semi-automatically.

Step S809: Wait 30 s.

Step S810: Determine whether a skill point exists.

After it is determined whether a skill point exists, if it is determined that no skill point exists, step S811 is performed, and if it is determined that a skill point exists, step S812 is performed.

Step S811: Determine that the system is inactive.

After the system is inactive, step S805 is performed.

Step S812: The system adds a point.

After the system adds a point, step S806 is performed.

The client in this embodiment levels up a character and reads a point addition mode. The point addition mode includes skipping adding a point automatically, adding a point automatically, and adding a point semi-automatically. After the skipping adding a point automatically is determined, the system is inactive, and the point addition operation is then reported to the server. After the adding a point automatically is determined, the system adds a point, and the point addition operation is then reported to the server. After the adding a point semi-automatically is determined, it is determined whether a skill point exists after wait 30 s, if it is determined that a skill point exists, the system adds a point, or otherwise, the system is inactive and the operation is then reported to the server.

The determination of skill level up after leveling up in this embodiment is performed by a corresponding client, and a skill level up operation is reported after determination is completed.

The method for determining system skill level up is described below.

A corresponding client determines to select a skill when the terminal levels up a skill. A determination mode is as follows.

Figure 9:
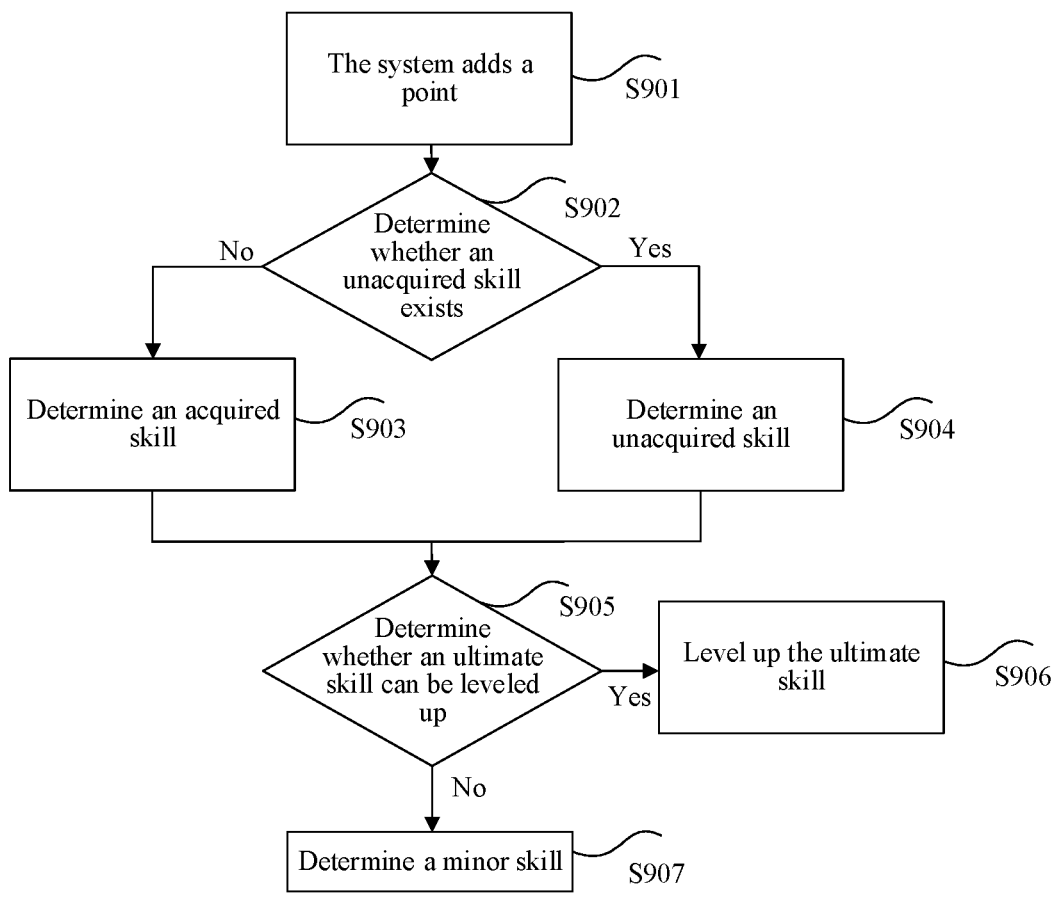
FIG. 9 is a flowchart of a method for determining a skill according to an embodiment of the present disclosure.

FIG. 9 is a flowchart of a method for determining a skill according to an embodiment of the present disclosure. As shown in FIG. 9, the method includes the following steps:

Step S901: The system adds a point.

Step S902: Determine whether an unacquired skill exists.

If it is determined that no unacquired skill exists, step S903 is performed. If it is determined that an unacquired skill exists, step S904 is performed.

Step S903: Determine an acquired skill.

Step S904: Determine an unacquired skill.

Step S905: Determine whether an ultimate skill can be leveled up.

After an acquired skill is determined or an unacquired skill is determined, it is determined whether an ultimate skill can be leveled up. If it is determined that the ultimate skill can be leveled up, step S906 is performed. If it is determined that the ultimate skill cannot be leveled up, step S907 is performed to determine a minor skill.

Step S906: Level up the ultimate skill.

After it is determined whether the ultimate skill can be leveled up, if it is determined that the ultimate skill can be leveled up, the ultimate skill is leveled up.

Step S907: Determine a minor skill.

After it is determined whether the ultimate skill can be leveled up, if it is determined that the ultimate skill cannot be leveled up, a minor skill is then determined.

Figure 10:
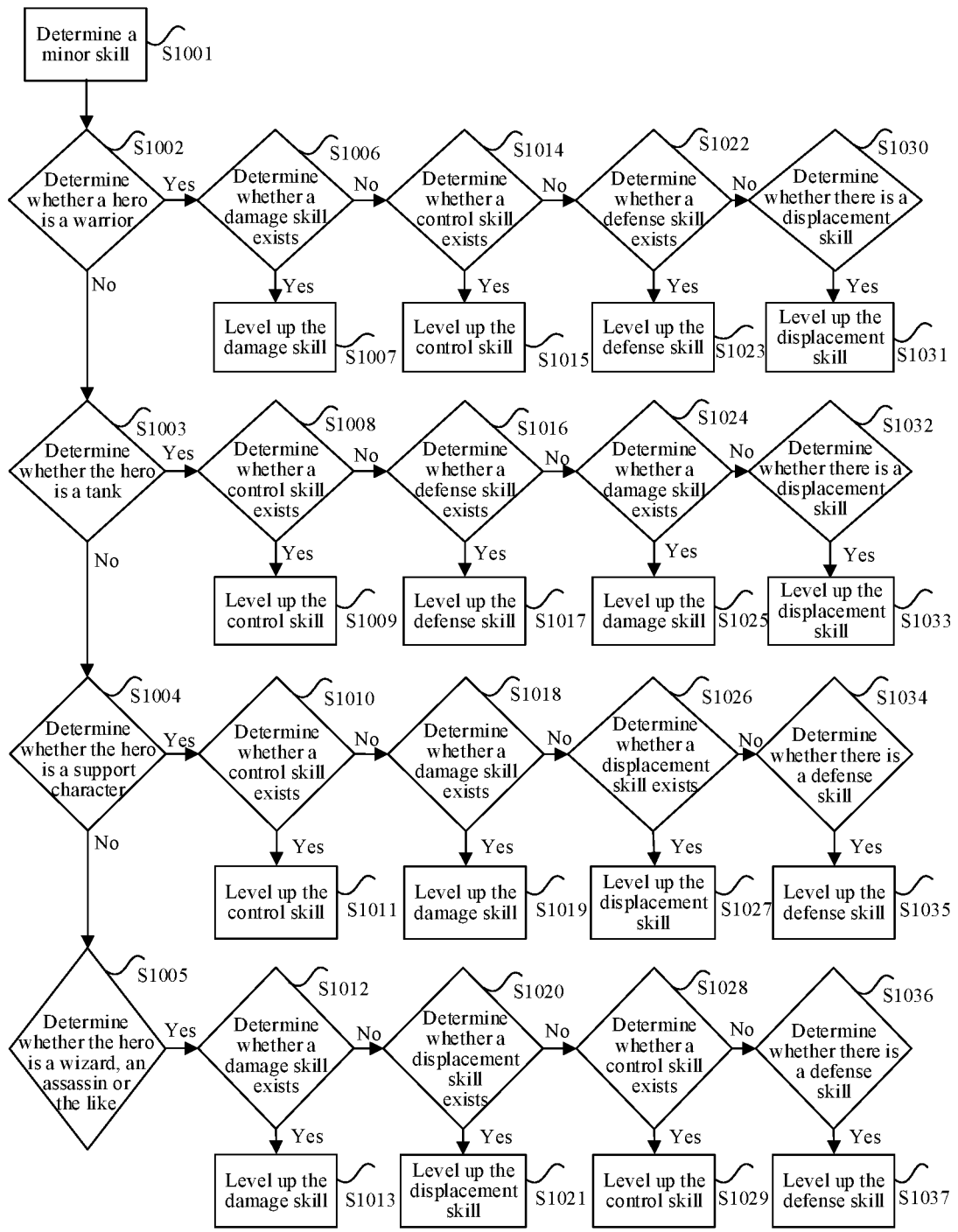
FIG. 10 is a flowchart of another method for determining a skill according to an embodiment of the present disclosure.

FIG. 10 is a flowchart of another method for determining a skill according to an embodiment of the present disclosure. As shown in FIG. 10, the method includes the following steps:

Step S1001: Determine a minor skill.

Step S1002: Determine whether a hero is a warrior.

If it is determined that the hero is a warrior, step S1006 is performed. If it is determined that the hero is not a warrior, step S1003 is performed.

Step S1003: Determine whether the hero is a tank.

After it is determined whether the hero is a warrior, if it is determined that the hero is not a warrior, it is determined whether the hero is a tank. If it is determined that the hero is a tank, step S1008 is performed. If it is determined that the hero is not a tank, step S1004 is performed.

Step S1004: Determine whether the hero is a support character.

After it is determined whether the hero is a tank, if it is determined that the hero is not a tank, it is determined whether the hero is a support character. If it is determined that the hero is a support character, step S1010 is performed. If it is determined that the hero is not a support character, step S1005 is performed.

Step S1005: Determine whether the hero is a wizard, an assassin or the like.

After it is determined whether the hero is a support character, if it is determined that the hero is not a support character, it is determined whether the hero is a wizard, assassin or the like. If it is determined that the hero is a wizard, an assassin or the like, step S1012 is performed.

Step S1006: Determine whether a damage skill exists.

After it is determined whether the hero is a warrior, if it is determined that the hero is a warrior, it is determined whether a damage skill exists. If it is determined that a damage skill exists, step S1007 is performed. If it is determined that no damage skill exists, step S1014 is performed.

Step S1007: Level up the damage skill.

After it is determined whether a damage skill exists, if it is determined that a damage skill exists, the damage skill is leveled up.

Step S1008: Determine whether a control skill exists.

After it is determined whether the hero is a tank, if it is determined that the hero is a tank, it is determined whether a control skill exists. If it is determined that a control skill exists, step S1009 is performed. If it is determined that no control skill exists, step S1016 is performed.

Step S1009: Level up the control skill.

After it is determined whether a control skill exists, if it is determined that a control skill exists, the control skill is leveled up.

Step S1010: Determine whether a control skill exists.

After it is determined whether the hero is a support character, if it is determined that the hero is a support character, it is determined whether a control skill exists. If it is determined that a control skill exists, step S1011 is performed. If it is determined that no control skill exists, step S1018 is performed.

Step S1011: Level up the control skill.

After it is determined whether a control skill exists, if it is determined that a control skill exists, the control skill is leveled up.

Step S1012: Determine whether a damage skill exists.

After whether the hero is a wizard, assassin or the like is determined, if it is determined that the hero is a wizard, assassin or the like, it is determined whether a damage skill exists. If it is determined that a damage skill exists, step S1013 is performed. If it is determined that no damage skill exists, step S1020 is performed.

Step S1013: Level up the damage skill.

After it is determined whether a damage skill exists, if it is determined that a damage skill exists, the damage skill is leveled up.

Step S1014: Determine whether a control skill exists.

After it is determined whether a damage skill exists, if it is determined that no damage skill exists, it is determined whether a control skill exists. If it is determined that a control skill exists, step S1015 is performed. If it is determined that no control skill exists, step S1022 is performed.

Step S1015: Level up the control skill.

After it is determined whether a control skill exists, if it is determined that a control skill exists, the control skill is leveled up.

Step S1016: Determine whether a defense skill exists.

After it is determined whether a control skill exists, if it is determined that no control skill exists, it is determined whether a defense skill exists. If it is determined that a defense skill exists, step S1017 is performed. If it is determined that no defense skill exists, step S1024 is performed.

Step S1017: Level up the defense skill.

After it is determined whether a defense skill exists, if it is determined that a defense skill exists, the defense skill is leveled up.

Step S1018: Determine whether a damage skill exists.

After it is determined whether a control skill exists, if it is determined that no control skill exists, it is determined whether a damage skill exists. If it is determined that a damage skill exists, step S1019 is performed. If it is determined that no damage skill exists, step S1026 is performed.

Step S1019: Level up the damage skill.

After it is determined whether a damage skill exists, if it is determined that a damage skill exists, the damage skill is leveled up.

Step S1020: Determine whether a displacement skill exists.

After it is determined whether a damage skill exists, if it is determined that no damage skill exists, it is determined whether a displacement skill exists. If it is determined that a displacement skill exists, step S1021 is performed. If it is determined that no displacement skill exists, step S1028 is performed.

Step S1021: Level up the displacement skill.

After it is determined whether a displacement skill exists, if it is determined that a displacement skill exists, the displacement skill is leveled up.

Step S1022: Determine whether a defense skill exists.

After it is determined whether a control skill exists, if it is determined that no control skill exists, it is determined whether a defense skill exists. If it is determined that a defense skill exists, step S1023 is performed. If it is determined that no defense skill exists, step S1030 is performed.

Step S1023: Level up the defense skill.

After it is determined whether a defense skill exists, if it is determined that a defense skill exists, the defense skill is leveled up.

Step S1024: Determine whether a damage skill exists.

After it is determined whether a defense skill exists, if it is determined that no defense skill exists, it is determined whether a damage skill exists. If it is determined that a damage skill exists, step S1025 is performed. If it is determined that no damage skill exists, step S1032 is performed.

Step S1025: Level up the damage skill.

After it is determined whether a damage skill exists, if it is determined that a damage skill exists, the damage skill is leveled up.

Step S1026: Determine whether a displacement skill exists.

After it is determined whether a damage skill exists, if it is determined that no damage skill exists, it is determined whether a displacement skill exists. If it is determined that a displacement skill exists, step S1027 is performed. If it is determined that no displacement skill exists, step S1034 is performed.

Step S1027: Level up the displacement skill.

After it is determined whether a displacement skill exists, if it is determined that a displacement skill exists, the displacement skill is leveled up.

Step S1028: Determine whether a control skill exists.

After it is determined whether a displacement skill exists, if it is determined that no displacement skill exists, it is determined whether a control skill exists. If it is determined that a control skill exists, step S1029 is performed. If it is determined that no control skill exists, step S1036 is performed.

Step S1029: Level up the control skill.

After it is determined whether a control skill exists, if it is determined that a control skill exists, the control skill is leveled up.

Step S1030: Determine whether there is a displacement skill.

After it is determined whether there is a defense skill, if it is determined that there is no defensive function, it is determined whether there is a displacement skill. If it is determined that there is a displacement skill, step S1031 is performed.

Step S1031: Level up the displacement skill.

After it is determined whether there is a displacement skill, if it is determined that there is a displacement skill, the displacement skill is leveled up.

Step S1032: Determine whether there is a displacement skill.

After it is determined whether a damage skill exists, if it is determined that no damage skill exists, it is determined whether there is a displacement skill. If it is determined that there is a displacement skill, step S1033 is performed.

Step S1033: Level up the displacement skill.

After it is determined whether there is a displacement skill, if it is determined that there is a displacement skill, the displacement skill is leveled up.

Step S1034: Determine whether there is a defense skill.

After it is determined whether a displacement skill exists, if it is determined that there is no displacement skill, it is determined whether there is a defense skill. If it is determined that there is a defense skill, step S1035 is performed.

Step S1035: Level up the defense skill.

After it is determined whether there is a defense skill, if it is determined that there is a defense skill, the defense skill is leveled up.

Step S1036: Determine whether there is a defense skill.

After it is determined whether a control skill exists, if it is determined that no control skill exists, it is determined whether there is a defense skill. If it is determined that there is a defense skill, step S1037 is performed.

Step S1037: Level up the defense skill.

After it is determined whether there is a defense skill, if it is determined that there is a defense skill, the defense skill is leveled up.

The following describes client-server communication.

In a frame synchronization technology, a server collects operation execution requests initiated by all clients in a single round within a fixed frame clock, summarizes the operation execution requests, and delivers the summarized operation execution requests to all the clients in the single round, and each client independently operates a result according to the summarized operation execution requests.

Figure 11:
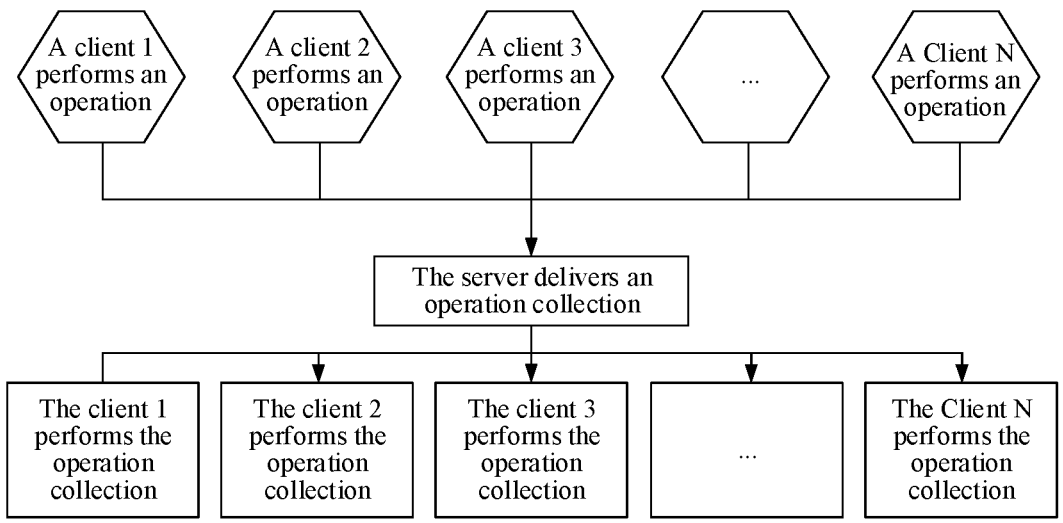
FIG. 11 is a schematic diagram of client-server communication according to an embodiment of the present disclosure.

FIG. 11 is a schematic diagram of client-server communication according to an embodiment of the present disclosure. As shown in FIG. 11, a client 1 to a client N report execution operations to the server, the server delivers an operation collection, and the client 1 to the client N perform the operation collection.

Figure 12:
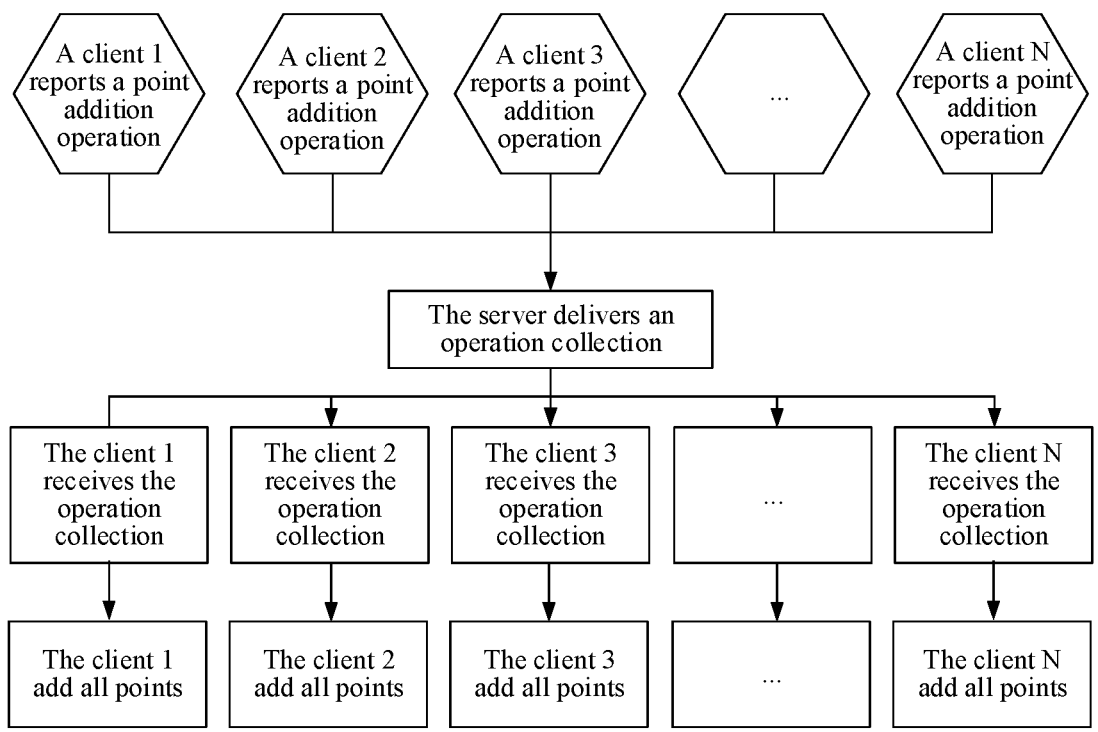
FIG. 12 is a schematic diagram of other client-server communication according to an embodiment of the present disclosure.

Based on the foregoing solution, after all clients in a single round report skill level up operations, the logic shown in FIG. 12 is performed. FIG. 12 is a schematic diagram of other client-server communication according to an embodiment of the present disclosure. As shown in FIG. 12, a client 1 to a client N report point addition operations to the server, and the server delivers an operation collection. The client 1 to the client N receive the operation collection and add all points. The operation collection is a collection of operations of adjusting the attributes of the virtual control object.

The hardware structure according to an embodiment of the present disclosure is described below.

In an environment of backend hardware, the server may use a 64-bit Linux operating system and may use an 8-core 16G PC server may be used.

Figure 13:
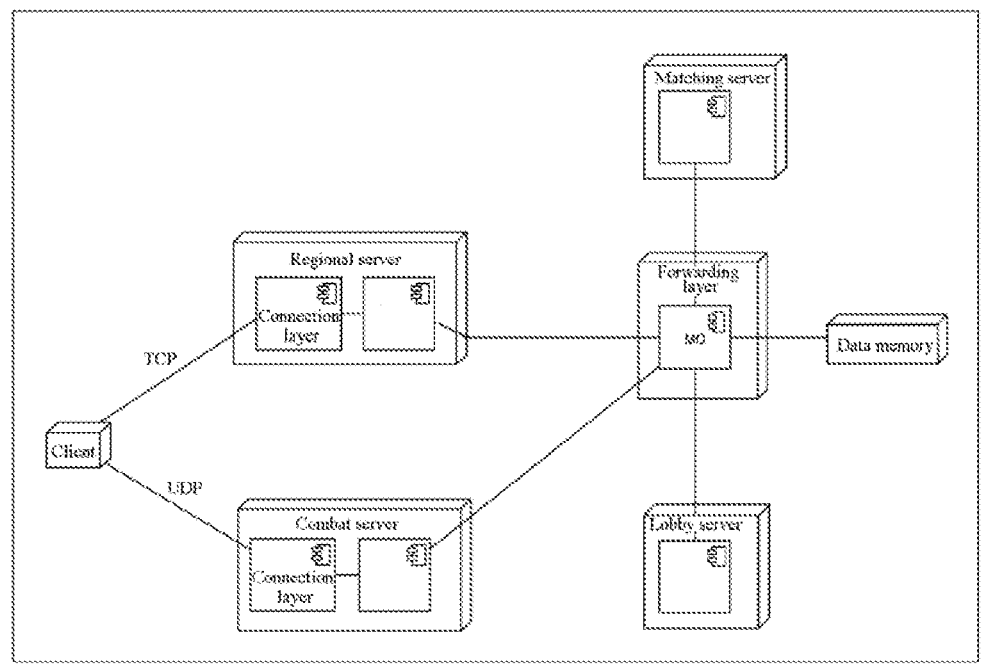
FIG. 13 is an architectural diagram of backend hardware according to an embodiment of the present disclosure.

FIG. 13 is an architectural diagram of backend hardware according to an embodiment of the present disclosure. As shown in FIG. 13, the backend hardware includes a client and servers. The client and the servers can establish a connection by using a transmission control protocol (TCP) or a user datagram protocol (UDP). There are various types of servers, for example, including a regional server, a combat server, a matching server, and a lobby server. The backend hardware also includes a forwarding layer and a data storage layer.

Optionally, the client in this embodiment may be connected to the regional server by using the TCP. The client may report point addition operation data to the regional server, and the regional server forwards the point addition operation data to the matching server and a data memory through the forwarding layer. The matching server is used for matching a corresponding attribute adjustment mode for the point addition operation data and then delivering an operation collection to the client. The data memory can store the point addition operation data. The client in this embodiment can also be connected to the combat server through the UDP, the client can report the point addition operation data to the combat server, and the combat server forwards the point addition operation data to the lobby server and the data memory through the forwarding layer. The lobby server is used for matching the corresponding attribute adjustment mode for the point addition operation data, and then delivering an operation collection to the client, and the data memory may store the point addition operation data. The regional server and the lobby server separately match corresponding attribute adjustment modes for the point addition operation data, thereby reducing the burden of data processing.

Optionally, for the adjustment of the skill level up mode in this embodiment, for both automatic adjustment and manual adjustment, the skill level up mode is solely adjusted by the client and is stored locally by the client after the adjustment but does not need to be reported to a server.

The application environment in this embodiment of the present disclosure may be, but not limited to, the application environment in the foregoing embodiment. Details are not described again in this embodiment. This embodiment of the present disclosure provides an optional specific application for implementing the foregoing method for adjusting attributes of an object.

Figure 14:
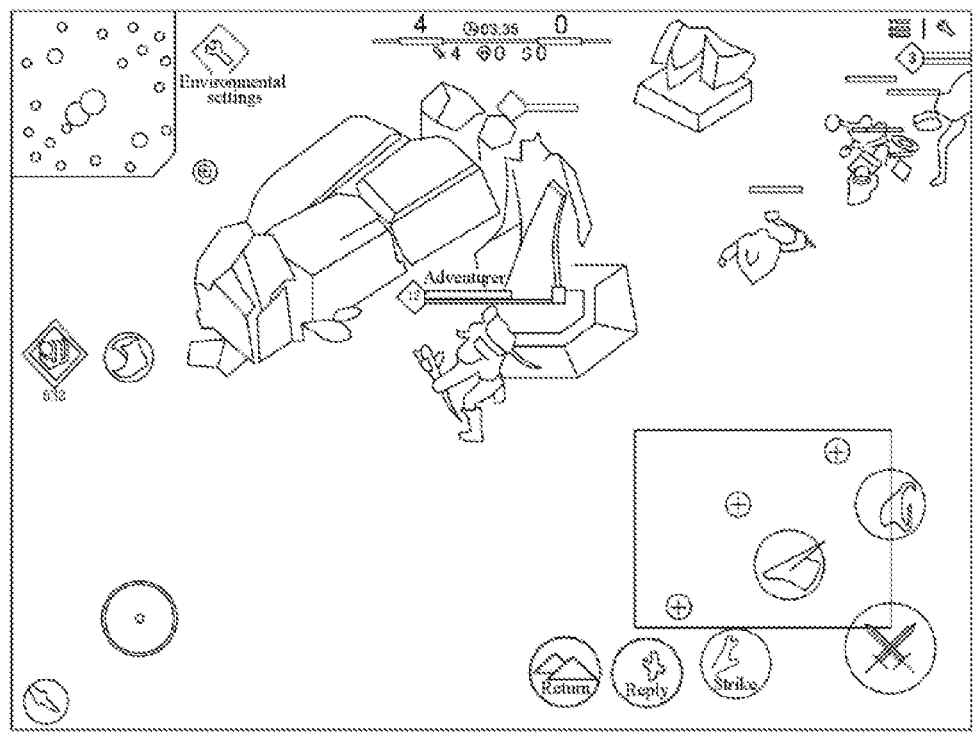
FIG. 14 is a schematic diagram of a skill level up scene according to an embodiment of the present disclosure.

FIG. 14 is a schematic diagram of a skill level up scene according to an embodiment of the present disclosure. As shown in FIG. 14, a game scene may be an MOBA game scene, and skills of a virtual control object may be leveled up by using "+" at the lower right corner of a game picture. According to the characteristics of the skills, the skills may significantly affect the combat experience of a player. An advanced player may choose appropriate modes to level up skills to enhance a hero to the greatest extent. Skill level up may impose a knowledge burden on a beginner player. Slightly complex skill rules and appropriate selection of level-up skills deprive a player of pure combat experience. As a result, the combat experience of a game can be enhanced by reducing the understanding burden for a player.

The foregoing embodiment is only an example of the embodiments of the present disclosure but does not constitute any limitation to the scope of the embodiments of the present disclosure.

In this embodiment, an intelligent skill level up mode is used to enhance the gaming experience of a player, especially the gaming experience of a beginner player. Different skill level up modes are provided to players with different levels of skill, an inexperienced player only needs to acquire less gaming information, so that the inexperienced player is allowed to focus on the core combat experience. A mode of controlling the gaming behavior is also provided to a skilled player. Therefore, most players can better immerse themselves in a game.

Regarding the foregoing method embodiments, for the simplicity of description, the embodiments are all described as a series of action combinations, but those skilled in the art are to know that the present disclosure is not limited to the described action order for the reason that according to the present disclosure, certain steps may be performed in another order or simultaneously. Secondly, those skilled in the art are also to know that the embodiments described in the description are all preferred embodiments, and the actions and modules involved are not necessarily required by the present disclosure.

Through the description of the foregoing embodiments, those skilled in the art could clearly understand that the method according to the foregoing embodiments can be implemented by means of software plus a necessary universal hardware platform, and of course, can also be implemented by hardware, but in many cases the former is the better implementation. Based on such an understanding, the essence or a part that contributes to the related art of the technical solution of the present disclosure can be embodied in the form of a software product. The computer software product is stored in a storage medium (such as a read-only memory (ROM)/a random access memory (RAM), a magnetic disk and an optical disc) and includes several instructions for enabling a terminal device (which may be a mobile phone, a computer, a server, a network device or the like) to perform the methods described in the embodiments of the present disclosure.

Figure 15:
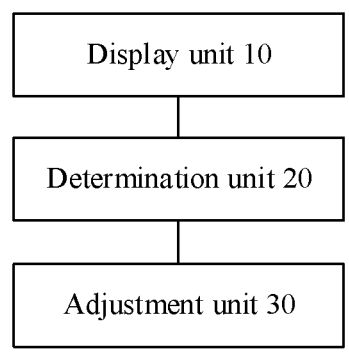
FIG. 15 is a schematic diagram of an apparatus for adjusting attributes of an object according to an embodiment of the present disclosure.

According to still another aspect of the embodiments of the present disclosure, an apparatus for implementing the method for adjusting attributes of an object is further provided, including one or more processors and one or more memories storing program units. The program units are performed by the processor, and the program units include a display unit, a determination unit, and an adjustment unit. FIG. 15 is a schematic diagram of an apparatus for adjusting attributes of an object according to an embodiment of the present disclosure. As shown in FIG. 15, the apparatus may include a display unit 10, a determination unit 20, and an adjustment unit 30.

The display unit 10 is configured to enable a terminal to display target prompt information in a target interface of a client as a target scene is run on the client, the target prompt information being used for prompting the adjustment of the attributes of a virtual control object controlled by a player in the target scene.

The determination unit 20 is configured to enable the terminal to determine, according to preset configuration information of the target scene, an adjustment mode of performing adjustment.

The adjustment unit 30 is configured to enable the terminal to automatically adjust the attributes of the virtual control object in a case that the determined adjustment mode is an automatic adjustment mode.

The display unit 10, the determination unit 20, and the adjustment unit 30 described above may run in the terminal as part of the apparatus, and the functions implemented by the foregoing units can be performed by the processor in the terminal. The terminal may also be a smartphone (such as an Android phone or an iOS phone), a tablet computer, a handheld computer, and a terminal device such as a mobile internet device (MID) and a PAD.

The display unit 10 in this embodiment may be configured to perform step S202 in this embodiment of this application, the determination unit 20 in this embodiment may be configured to perform step S204 in this embodiment of this application, and the adjustment unit 30 in this embodiment may be configured to perform step S206 in this embodiment of this application.

In this embodiment, the display unit 10 is used to enable the terminal to display target prompt information in a target interface of a client as a target scene is run on the client. The target prompt information is used for prompting the adjustment of the attributes of a virtual control object controlled by a player in the target scene. The determination unit 20 is used to enable the terminal to determine, according to preset configuration information of the target scene, an adjustment mode of performing adjustment. The adjustment unit 30 is used to enable the terminal to automatically adjust the attributes of the virtual control object in a case that the determined adjustment mode is an automatic adjustment mode. That is, the target prompt information displayed in the target interface of the client is used to prompt the adjustment of the attributes of the virtual control object controlled by the player in the target scene, and in a case that the adjustment mode determined according to the preset configuration information of the target scene is an automatic adjustment mode, the attributes of the virtual control object are automatically adjusted, so that different players are prevented from autonomously adjusting the attributes of the virtual control object, to achieve the technical effect of making it more flexible to adjust the attributes of the virtual control object, thereby solving the technical problem that it is insufficiently flexible to adjust the attributes of a virtual control object in the related art.

The examples and application scenes implemented by the foregoing units and corresponding steps are the same, but are not limited to the content disclosed in the foregoing embodiments. The foregoing units, as part of the apparatus, may operate in a hardware environment as shown in FIG. 1, and may be implemented by software or hardware, where the hardware environment includes a network environment.

According to still another aspect of the embodiments of the present disclosure, an electronic device for implementing the method for adjusting attributes of an object is further provided.

Figure 16:
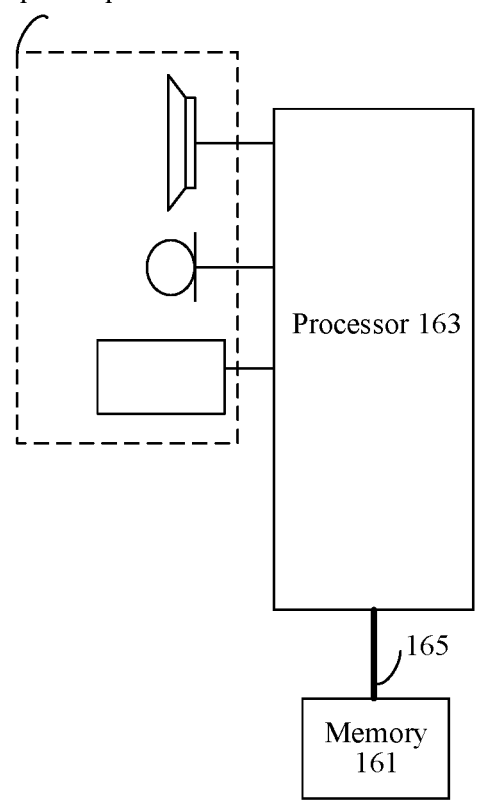
FIG. 16 is a structural block diagram of an electronic device according to an embodiment of the present disclosure.

FIG. 16 is a structural block diagram of an electronic device according to an embodiment of the present disclosure. As shown in FIG. 16, the electronic device may include a memory 161 and one or more (only one processor 163 is shown in the figure) processors 163. The memory 161 may store a computer program. The processor 163 may be configured to execute the computer program to perform the method for adjusting attributes of an object according to the embodiments of the present disclosure.

The memory 161 may be used for storing computer programs and modules, for example, the program instructions/modules corresponding to the method and apparatus for adjusting attributes of an object in the embodiments of the present disclosure. The processor 163 is configured to execute software programs and modules stored in the memory 161, thereby performing various functional applications and data processing, that is, the foregoing method for adjusting attributes of an object is implemented. The memory 161 may include a high-speed RAM, and may further include a non-volatile memory such as one or more magnetic storage devices, a flash memory or other non-volatile solid-state memories. In some examples, the memory 161 may further include memories remotely disposed with respect to the processor 163, and these remote memories may be connected to the terminal by a network. The examples of the foregoing network include, but not limited to, the Internet, an intranet, a LAN, a mobile communication network, and combinations thereof.

Optionally, as shown in FIG. 16, the electronic device may further include a transmission device 165 and an input/output device 167. The transmission device 165 is configured to receive or send data via one network. Specific examples of the foregoing network may include a wired network and a wireless network. In one example, the transmission device 165 includes a network interface controller (NIC), which can be connected to other network devices and routers by a network cable so as to communicate with the Internet or a LAN. In one example, the transmission device 165 is a radio frequency (RF) module, which is configured to wirelessly communicate with the Internet.

Optionally, the memory 161 is configured to store an application program.

The processor 163 may be configured to invoke the computer program stored in the memory 161 by using the transmission device 165 to perform the following steps:

displaying, by a terminal, target prompt information in a target interface of a client as a target scene is run on the client, the target prompt information being used for prompting the adjustment of the attributes of a virtual control object controlled by a player in the target scene; and determining, by the terminal according to preset configuration information of the target scene, an adjustment mode of performing adjustment; and automatically adjusting, by the terminal, the attributes of the virtual control object in a case that the determined adjustment mode is an automatic adjustment mode.

The processor 163 is further configured to perform the following step: automatically adjusting, by the terminal, the attributes of the virtual control object as soon as the target prompt information is displayed in a case that the determined adjustment mode is a first automatic adjustment mode, where the automatic adjustment mode includes the first automatic adjustment mode; or automatically adjusting, by the terminal, the attributes of the virtual control object after a first predetermined time length is delayed starting from the display of the target prompt information in a case that the determined adjustment mode is a second automatic adjustment mode, where the automatic adjustment mode includes the second automatic adjustment mode.

The processor 163 is further configured to perform the following step: automatically adjusting, by the terminal, the attributes of the virtual control object after the first predetermined time length is delayed starting from the display of the target prompt information in a case that the terminal does not receive a manual adjustment instruction within the first predetermined time length, where the manual adjustment instruction is used for adjusting the attributes of the virtual control object.

The processor 163 is further configured to perform the following step: acquiring, by the terminal, operation information of a completed target scene of the player; and setting, by the terminal, the configuration information to indicate that the adjustment mode is the automatic adjustment mode in a case that the operation information indicates first target status information, where the first target status information is used for indicating that all the attributes of the virtual control object in the completed target scene are not adjusted within a second predetermined time length.

The processor 163 is further configured to perform the following step: setting, by the terminal, the configuration information to indicate that the adjustment mode is the first automatic adjustment mode in a case that the operation information indicates first sub-target status information, where the first automatic adjustment mode is used for instructing to automatically adjust the attributes of the virtual control object as soon as the target prompt information is displayed, the first target status information includes the first sub-target status information, the first sub-target status information is used for indicating that an adjustment ratio of the attributes is less than a first predetermined threshold, and the adjustment ratio is a ratio of the number of times of adjusting the attributes of the virtual control object within the second predetermined time length in the completed target scene to the total number of times of adjusting the attributes of the virtual control object in the completed target scene.

The processor 163 is further configured to perform the following step: setting, by the terminal, the configuration information to indicate that the adjustment mode is the second automatic adjustment mode in a case that the operation information indicates second sub-target status information, where the second automatic adjustment mode is used for instructing to automatically adjust the attributes of the virtual control object after a first predetermined time length is delayed starting from the display of the target prompt information, the first target status information includes the second sub-target status information, the second sub-target status information is used for indicating that an adjustment ratio of the attributes is greater than or equal to the first predetermined threshold and less than a second predetermined threshold, and the adjustment ratio is a ratio of the number of times of adjusting the attributes of the virtual control object within the second predetermined time length in the completed target scene to the total number of times of adjusting the attributes of the virtual control object in the completed target scene.

The processor 163 is further configured to perform the following step: adjusting, by the terminal, the adjustment mode from a current autonomous adjustment mode to the automatic adjustment mode in a case that the operation information indicates the first target status information, and setting the configuration information to indicate that the adjustment mode is the automatic adjustment mode, where the autonomous adjustment mode is used for instructing the player to adjust the attributes of the virtual control object.

The processor 163 is further configured to perform the following step: keeping, by the terminal, the current autonomous adjustment mode as the adjustment mode in a case that the operation information indicates the second target status information, and keeping the configuration information to indicate that the adjustment mode is the autonomous adjustment mode, where the second target status information is used for indicating that the adjustment ratio of the attributes is greater than the second predetermined threshold, the adjustment ratio is a ratio of the number of times of adjusting the attributes of the virtual control object within the second predetermined time length in the completed target scene to the total number of times of adjusting the attributes of the virtual control object in the completed target scene, and the autonomous adjustment mode is used for instructing the player to adjust the attributes of the virtual control object.

The processor 163 is further configured to perform the following step: acquiring, by the terminal, operation information of a completed target scene of the player; setting, by the terminal, the configuration information to indicate that the adjustment mode is the second automatic adjustment mode in a case that the operation information indicates third target status information, where the third target status information is used for indicating that the adjustment ratio of the attributes is greater than or equal to a third predetermined threshold and less than or equal to a fourth predetermined threshold, and the adjustment ratio is a ratio of the number of times of adjusting the attributes of the virtual control object within the second predetermined time length in the completed target scene to the total number of times of adjusting the attributes of the virtual control object in the completed target scene.

The processor 163 is further configured to perform the following step: keeping, by the terminal, the adjustment mode as the current second automatic adjustment mode in a case that the operation information indicates the third target status information, and keeping the configuration information to indicate that the adjustment mode is the second automatic adjustment mode.

The processor 163 is further configured to perform the following step: setting, by the terminal, the configuration information to indicate that the adjustment mode is an autonomous adjustment mode in a case that the operation information indicates fourth target status information, where the fourth target status information is used for indicating that the adjustment ratio of the attributes is greater than the fourth predetermined threshold, and the autonomous adjustment mode is used for instructing the player to adjust the attributes of the virtual control object.

The processor 163 is further configured to perform one of the following steps: determining, by the terminal, an attribute that the virtual control object does not have in the target scene as an attribute that needs to be automatically adjusted of the virtual control object; determining, by the terminal, an attribute used for producing a target operation result for the virtual control object in the target scene, as an attribute that needs to be automatically adjusted of the virtual control object; and determining, by the terminal, an attribute corresponding to a profession of the virtual control object in the target scene as an attribute that needs to be automatically adjusted of the virtual control object. By means of this embodiment of the present disclosure, a method for adjusting attributes of an object is provided. A terminal displays target prompt information in a target interface of a client as a target scene is run on the client, the target prompt information being used for prompting the adjustment of the attributes of a virtual control object controlled by a player in the target scene; the terminal determines, according to preset configuration information of the target scene, an adjustment mode of performing adjustment; and the terminal automatically adjusts the attributes of the virtual control object in a case that the determined adjustment mode is an automatic adjustment mode. That is, the target prompt information displayed in the target interface of the client is used to prompt the adjustment of the attributes of the virtual control object controlled by the player in the target scene, and in a case that the adjustment mode determined according to the preset configuration information of the target scene is an automatic adjustment mode, the attributes of the virtual control object are automatically adjusted, so that different players are prevented from autonomously adjusting the attributes of the virtual control object, to achieve the technical effect of making it more flexible to adjust the attributes of the virtual control object, thereby solving the technical problem that it is insufficiently flexible to adjust the attributes of a virtual control object in the related art.

Optionally, specific examples in this embodiment may be the examples described in the foregoing embodiments. Details are not described again in this embodiment.

Those of ordinary skill in the art could understand that the structure shown in FIG. 16 is only schematic, and the electronic device may also be a smart phone (such as an Android phone and an iOS phone), a tablet computer, a handheld computer, a MID, a PAD and other terminal devices. FIG. 16 does not limit the structure of the foregoing electronic device. For example, the electronic device may further include more or less components (such as a network interface and a display device) than those shown in FIG. 16, or have a different configuration from that shown in FIG. 16.

An embodiment of the present disclosure further provides a storage medium. Optionally, in this embodiment, a computer program is stored in the foregoing storage medium, and the computer program is configured to be executed to perform the steps in any one of the foregoing method embodiments.

Optionally, in this embodiment, the foregoing storage medium may be configured to store a computer program for performing the following steps:

displaying, by a terminal, target prompt information in a target interface of a client as a target scene is run on the client, the target prompt information being used for prompting the adjustment of the attributes of a virtual control object controlled by a player in the target scene; and determining, by the terminal according to preset configuration information of the target scene, an adjustment mode of performing adjustment; and automatically adjusting, by the terminal, the attributes of the virtual control object in a case that the determined adjustment mode is an automatic adjustment mode.

Optionally, the storage medium is further configured to store a program code for performing the following step: automatically adjusting, by the terminal, the attributes of the virtual control object as soon as the target prompt information is displayed in a case that the determined adjustment mode is a first automatic adjustment mode, where the automatic adjustment mode includes the first automatic adjustment mode; or automatically adjusting, by the terminal, the attributes of the virtual control object after a first predetermined time length is delayed starting from the display of the target prompt information in a case that the determined adjustment mode is a second automatic adjustment mode, where the automatic adjustment mode includes the second automatic adjustment mode.

Optionally, the storage medium is further configured to store a program code for performing the following step: automatically adjusting, by the terminal, the attributes of the virtual control object after the first predetermined time length is delayed starting from the display of the target prompt information in a case that the terminal does not receive a manual adjustment instruction within the first predetermined time length, where the manual adjustment instruction is used for adjusting the attributes of the virtual control object.

Optionally, the storage medium is further configured to store a program code for performing the following step: acquiring, by the terminal, operation information of a completed target scene of the player; and setting, by the terminal, the configuration information to indicate that the adjustment mode is the automatic adjustment mode in a case that the operation information indicates first target status information, where the first target status information is used for indicating that all the attributes of the virtual control object in the completed target scene are not adjusted within a second predetermined time length.

Optionally, the storage medium is further configured to store a program code for performing the following step: setting, by the terminal, the configuration information to indicate that the adjustment mode is the first automatic adjustment mode in a case that the operation information indicates first sub-target status information, where the first automatic adjustment mode is used for instructing to automatically adjust the attributes of the virtual control object as soon as the target prompt information is displayed, the first target status information includes the first sub-target status information, the first sub-target status information is used for indicating that an adjustment ratio of the attributes is less than a first predetermined threshold, and the adjustment ratio is a ratio of the number of times of adjusting the attributes of the virtual control object within the second predetermined time length in the completed target scene to the total number of times of adjusting the attributes of the virtual control object in the completed target scene.

Optionally, the storage medium is further configured to store a program code for performing the following step: setting, by the terminal, the configuration information to indicate that the adjustment mode is the second automatic adjustment mode in a case that the operation information indicates second sub-target status information, where the second automatic adjustment mode is used for instructing to automatically adjust the attributes of the virtual control object after a first predetermined time length is delayed starting from the display of the target prompt information, the first target status information includes the second sub-target status information, the second sub-target status information is used for indicating that an adjustment ratio of the attributes is greater than or equal to the first predetermined threshold and less than a second predetermined threshold, and the adjustment ratio is a ratio of the number of times of adjusting the attributes of the virtual control object within the second predetermined time length in the completed target scene to the total number of times of adjusting the attributes of the virtual control object in the completed target scene.

Optionally, the storage medium is further configured to store a program code for performing the following step: adjusting, by the terminal, the adjustment mode from a current autonomous adjustment mode to the automatic adjustment mode in a case that the operation information indicates the first target status information, and setting the configuration information to indicate that the adjustment mode is the automatic adjustment mode, where the autonomous adjustment mode is used for instructing the player to adjust the attributes of the virtual control object.

Optionally, the storage medium is further configured to store a program code for performing the following step: keeping, by the terminal, the current autonomous adjustment mode as the adjustment mode in a case that the operation information indicates the second target status information, and keeping the configuration information to indicate that the adjustment mode is the autonomous adjustment mode, where the second target status information is used for indicating that the adjustment ratio of the attributes is greater than the second predetermined threshold, the adjustment ratio is a ratio of the number of times of adjusting the attributes of the virtual control object within the second predetermined time length in the completed target scene to the total number of times of adjusting the attributes of the virtual control object in the completed target scene, and the autonomous adjustment mode is used for instructing the player to adjust the attributes of the virtual control object.

Optionally, the storage medium is further configured to store a program code for performing the following step: acquiring, by the terminal, operation information of a completed target scene of the player; setting, by the terminal, the configuration information to indicate that the adjustment mode is the second automatic adjustment mode in a case that the operation information indicates third target status information, where the third target status information is used for indicating that the adjustment ratio of the attributes is greater than or equal to a third predetermined threshold and less than or equal to a fourth predetermined threshold, and the adjustment ratio is a ratio of the number of times of adjusting the attributes of the virtual control object within the second predetermined time length in the completed target scene to the total number of times of adjusting the attributes of the virtual control object in the completed target scene.

Optionally, the storage medium is further configured to store a program code for performing the following step: keeping, by the terminal, the adjustment mode as the current second automatic adjustment mode in a case that the operation information indicates the third target status information, and keeping the configuration information to indicate that the adjustment mode is the second automatic adjustment mode.

Optionally, the storage medium is further configured to store a program code for performing the following step: setting, by the terminal, the configuration information to indicate that the adjustment mode is an autonomous adjustment mode in a case that the operation information indicates fourth target status information, where the fourth target status information is used for indicating that the adjustment ratio of the attributes is greater than the fourth predetermined threshold, and the autonomous adjustment mode is used for instructing the player to adjust the attributes of the virtual control object.

Optionally, the storage medium is further configured to store a program code for performing one of the following steps: determining, by the terminal, an attribute that the virtual control object does not have in the target scene as an attribute that needs to be automatically adjusted of the virtual control object; determining, by the terminal, an attribute used for producing a target operation result for the virtual control object in the target scene, as an attribute that needs to be automatically adjusted of the virtual control object; and determining, by the terminal, an attribute corresponding to a profession of the virtual control object in the target scene as an attribute that needs to be automatically adjusted of the virtual control object.

Optionally, the storage medium is further configured to store a computer program for performing the steps included in the methods in the foregoing embodiments. Details are not described herein again in this embodiment.

Optionally, in this embodiment, persons of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a ROM, a RAM, a magnetic disk, an optical disc, and the like.

The method and apparatus for adjusting attributes of an object, the storage medium, and the electronic apparatus according to the present disclosure are described above by using examples with reference to the accompanying drawings. However, a person skilled in the art is to understand that, various improvements may be further made for the method and apparatus for adjusting attributes of an object, the storage medium, and the electronic apparatus provided in the present disclosure without departing from content of the present disclosure. Therefore, the protection scope of the embodiments of the present disclosure is to be subject to the content of the appended claims.

The sequence numbers of the foregoing embodiments of the present disclosure are merely for the convenience of description, and do not imply the preference among the embodiments.

When the integrated unit in the foregoing embodiments is implemented in the form of a software function unit and sold or used as an independent product, the integrated unit may be stored in the foregoing computer-readable storage medium. Based on such an understanding, the technical solutions of the present disclosure, or the part contributing to the related art, or all or some of the technical solutions may essentially be presented in the form of a software product. The computer software product is stored in the storage medium, and includes several instructions for instructing one or more computer devices (which may be a PC, a server, a network device or the like) to perform all or some of the steps of the methods described in the embodiments of the present disclosure.

In the foregoing embodiments of the present disclosure, the descriptions of the embodiments have their respective focuses. For a part that is not described in detail in an embodiment, refer to related descriptions in other embodiments.

In the several embodiments provided in this application, it is understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in the form of hardware, or may be implemented in the form of a software function unit.

The foregoing descriptions are exemplary implementations of the present disclosure. Persons of ordinary skill in the art may make some improvements and polishing without departing from the principle of the present disclosure and the improvements and polishing shall fall within the protection scope of the present disclosure.

INDUSTRIAL APPLICABILITY

In the embodiments of the present disclosure, a terminal displays target prompt information in a target interface of a client as a target scene is run on the client, the target prompt information being used for prompting the adjustment of the attributes of a virtual control object controlled by a player in the target scene; the terminal determines, according to preset configuration information of the target scene, an adjustment mode of performing adjustment; and the terminal automatically adjusts the attributes of the virtual control object in a case that the determined adjustment mode is an automatic adjustment mode. That is, the target prompt information displayed in the target interface of the client is used to prompt the adjustment of the attributes of the virtual control object controlled by the player in the target scene, and in a case that the adjustment mode determined according to the preset configuration information of the target scene is an automatic adjustment mode, the attributes of the virtual control object are automatically adjusted, so that different players are prevented from autonomously adjusting the attributes of the virtual control object, to achieve the technical effect of making it more flexible to adjust the attributes of the virtual control object, thereby solving the technical problem that it is insufficiently flexible to adjust the attributes of a virtual control object in the related art.

What is claimed is:

1. A method for adjusting attributes of an object, comprising:
    while executing, by a terminal, a target scene of a client:
        displaying, by the terminal, target prompt information in a target interface of the client, the target prompt information being used for prompting the adjustment of the attributes of a virtual control object controlled by a player of the terminal in the target scene;
        in response to the target prompt information, determining, by the terminal according to preset configuration information of the target scene, an adjustment mode indicating a skill level of the player; and
    automatically adjusting, by the terminal, the attributes of the virtual control object in a case that the determined adjustment mode is an automatic adjustment mode, including:
        in accordance with a determination that the determined adjust mode is a first automatic adjustment mode indicating the player having a first skill level, automatically adjusting, by the terminal, the attributes of the virtual control object immediately in response to the target prompt information; and
        in accordance with a determination that the determined adjust mode is a second automatic adjustment mode indicating the player having a second skill level that is higher than the first skill level, automatically adjusting, by the terminal, the attributes of the virtual control object after a first predetermined time length starting from the display of the target prompt information.

2. The method according to claim 1, wherein the automatically adjusting, by the terminal, the attributes of the virtual control object after a first predetermined time length starting from the display of the target prompt information comprises:
    automatically adjusting, by the terminal, the attributes of the virtual control object after the first predetermined time length starting from the display of the target prompt information when the terminal does not receive a manual adjustment instruction within the first predetermined time length, wherein the manual adjustment instruction is used for adjusting the attributes of the virtual control object.

3. The method according to claim 2, further comprising:
    before displaying, by the terminal, target prompt information in the target interface of the client:
    acquiring, by the terminal, operation information of a completed target scene of the player; and
    setting, by the terminal, the configuration information to indicate that the adjustment mode is the automatic adjustment mode when the operation information indicates first target status information, wherein the first target status information is used for indicating that all the attributes of the virtual control object in the completed target scene are not adjusted within a second predetermined time length.

4. The method according to claim 3, wherein the setting, by the terminal, the configuration information to indicate that the adjustment mode is the automatic adjustment mode when the operation information indicates first target status information comprises:
    setting, by the terminal, the configuration information to indicate that the adjustment mode is the first automatic adjustment mode when the operation information indicates first sub-target status information, wherein the first automatic adjustment mode is used for instructing to automatically adjust the attributes of the virtual control object as soon as the target prompt information is displayed, the first target status information comprises the first sub-target status information, the first sub-target status information is used for indicating that an adjustment ratio of the attributes is less than a first predetermined threshold, and the adjustment ratio is a ratio of the number of times of adjusting the attributes of the virtual control object within the second predetermined time length in the completed target scene to the total number of times of adjusting the attributes of the virtual control object in the completed target scene.

5. The method according to claim 3, wherein the setting, by the terminal, the configuration information to indicate that the adjustment mode is the automatic adjustment mode when the operation information indicates first target status information comprises:

setting, by the terminal, the configuration information to indicate that the adjustment mode is the second automatic adjustment mode when the operation information indicates second sub-target status information, wherein the second automatic adjustment mode is used for instructing to automatically adjust the attributes of the virtual control object after a first predetermined time length is delayed starting from the display of the target prompt information, the first target status information comprises the second sub-target status information, the second sub-target status information is used for indicating that an adjustment ratio of the attributes is greater than or equal to the first predetermined threshold and less than a second predetermined threshold, and the adjustment ratio is a ratio of the number of times of adjusting the attributes of the virtual control object within the second predetermined time length in the completed target scene to the total number of times of adjusting the attributes of the virtual control object in the completed target scene.

6. The method according to claim 3, wherein the setting, by the terminal, the configuration information to indicate that the adjustment mode is the automatic adjustment mode when the operation information indicates first target status information comprises:

adjusting, by the terminal, the adjustment mode from a current autonomous adjustment mode to the automatic adjustment mode in a case that the operation information indicates the first target status information, and setting the configuration information to indicate that the adjustment mode is the automatic adjustment mode, wherein the autonomous adjustment mode is used for instructing the player to adjust the attributes of the virtual control object.

7. The method according to claim 3, further comprising:
after acquiring, by the terminal, operation information of a completed target scene of the player:
keeping, by the terminal, the current autonomous adjustment mode as the adjustment mode in a case that the operation information indicates the second target status information, and keeping the configuration information to indicate that the adjustment mode is the autonomous adjustment mode, wherein the second target status information is used for indicating that the adjustment ratio of the attributes is greater than the second predetermined threshold, the adjustment ratio is a ratio of the number of times of adjusting the attributes of the virtual control object within the second predetermined time length in the completed target scene to the total number of times of adjusting the attributes of the virtual control object in the completed target scene, and the autonomous adjustment mode is used for instructing the player to adjust the attributes of the virtual control object.

8. The method according to claim 2, further comprising:
before displaying, by a terminal, target prompt information in a target interface of a client:
acquiring, by the terminal, operation information of a completed target scene of the player;
setting, by the terminal, the configuration information to indicate that the adjustment mode is the second automatic adjustment mode in a case that the operation information indicates third target status information, wherein the third target status information is used for indicating that the adjustment ratio of the attributes is greater than or equal to a third predetermined threshold and less than or equal to a fourth predetermined threshold, and the adjustment ratio is a ratio of the number of times of adjusting the attributes of the virtual control object within the second predetermined time length in the completed target scene to the total number of times of adjusting the attributes of the virtual control object in the completed target scene.

9. The method according to claim 8, wherein the setting, by the terminal, the configuration information to indicate that the adjustment mode is the second automatic adjustment mode in a case that the operation information indicates third target status information comprises:

keeping, by the terminal, the adjustment mode as the current second automatic adjustment mode in a case that the operation information indicates the third target status information, and keeping the configuration information to indicate that the adjustment mode is the second automatic adjustment mode.

10. The method according to claim 8, further comprising:
after acquiring, by the terminal, operation information of a completed target scene of the player:
setting, by the terminal, the configuration information to indicate that the adjustment mode is an autonomous adjustment mode in a case that the operation information indicates fourth target status information, wherein the fourth target status information is used for indicating that the adjustment ratio of the attributes is greater than the fourth predetermined threshold, and the autonomous adjustment mode is used for instructing the player to adjust the attributes of the virtual control object.

11. The method according to claim 1, wherein the automatically adjusting, by the terminal, the attributes of the virtual control object comprises at least one of the following operations:

determining, by the terminal, an attribute that the virtual control object does not have in the target scene as an attribute that needs to be automatically adjusted of the virtual control object;

determining, by the terminal, an attribute used for producing a target operation result for the virtual control object in the target scene, as an attribute that needs to be automatically adjusted of the virtual control object; and determining, by the terminal, an attribute corresponding to a profession of the virtual control object in the target scene as an attribute that needs to be automatically adjusted of the virtual control object.

12. A terminal, comprising memory and a processor, a plurality of computer programs being stored in the memory, and the processor being configured to execute the computer programs to perform a plurality of operations including:

while executing a target scene of a client:
displaying target prompt information in a target interface of the client, the target prompt information being used for prompting the adjustment of the attributes of a virtual control object controlled by a player of the terminal in the target scene;

in response to the target prompt information, determining, according to preset configuration information of the target scene, an adjustment mode indicating a skill level of the player; and automatically adjusting the attributes of the virtual control object in a case that the determined adjustment mode is an automatic adjustment mode, including:
- in accordance with a determination that the determined adjust mode is a first automatic adjustment mode indicating the player having a first skill level, automatically adjusting, by the terminal, the attributes of the virtual control object immediately in response to the target prompt information; and
- in accordance with a determination that the determined adjust mode is a second automatic adjustment mode indicating the player having a second skill level that is higher than the first skill level, automatically adjusting, by the terminal, the attributes of the virtual control object after a first predetermined time length starting from the display of the target prompt information.

13. The terminal according to claim 3, wherein the automatically adjusting, by the terminal, the attributes of the virtual control object after a first predetermined time length starting from the display of the target prompt information comprises:
- automatically adjusting, by the terminal, the attributes of the virtual control object after the first predetermined time length starting from the display of the target prompt information when the terminal does not receive a manual adjustment instruction within the first predetermined time length, wherein the manual adjustment instruction is used for adjusting the attributes of the virtual control object.

14. The terminal according to claim 12, wherein the automatically adjusting, by the terminal, the attributes of the virtual control object comprises at least one of the following operations:
- determining, by the terminal, an attribute that the virtual control object does not have in the target scene as an attribute that needs to be automatically adjusted of the virtual control object;
- determining, by the terminal, an attribute used for producing a target operation result for the virtual control object in the target scene, as an attribute that needs to be automatically adjusted of the virtual control object; and
- determining, by the terminal, an attribute corresponding to a profession of the virtual control object in the target scene as an attribute that needs to be automatically adjusted of the virtual control object.

15. A non-transitory computer readable storage medium storing a plurality of computer programs that, when executed by a terminal having one or more processors, cause the terminal to perform a plurality of operations including:
- while executing a target scene of a client:
  - displaying target prompt information in a target interface of the client, the target prompt information being used for prompting the adjustment of the attributes of a virtual control object controlled by a player of the terminal in the target scene;
  - in response to the target prompt information, determining, according to preset configuration information of the target scene, an adjustment mode indicating a skill level of the player; and
  - automatically adjusting the attributes of the virtual control object in a case that the determined adjustment mode is an automatic adjustment mode, including:
    - in accordance with a determination that the determined adjust mode is a first automatic adjustment mode indicating the player having a first skill level, automatically adjusting, by the terminal, the attributes of the virtual control object immediately in response to the target prompt information; and
    - in accordance with a determination that the determined adjust mode is a second automatic adjustment mode indicating the player having a second skill level that is higher than the first skill level, automatically adjusting, by the terminal, the attributes of the virtual control object after a first predetermined time length starting from the display of the target prompt information.

16. The non-transitory computer readable storage medium according to claim 15, wherein the automatically adjusting, by the terminal, the attributes of the virtual control object after a first predetermined time length starting from the display of the target prompt information comprises:
- automatically adjusting, by the terminal, the attributes of the virtual control object after the first predetermined time length starting from the display of the target prompt information when the terminal does not receive a manual adjustment instruction within the first predetermined time length, wherein the manual adjustment instruction is used for adjusting the attributes of the virtual control object.

17. The non-transitory computer readable storage medium according to claim 15, wherein the automatically adjusting, by the terminal, the attributes of the virtual control object comprises at least one of the following operations:
- determining, by the terminal, an attribute that the virtual control object does not have in the target scene as an attribute that needs to be automatically adjusted of the virtual control object;
- determining, by the terminal, an attribute used for producing a target operation result for the virtual control object in the target scene, as an attribute that needs to be automatically adjusted of the virtual control object; and
- determining, by the terminal, an attribute corresponding to a profession of the virtual control object in the target scene as an attribute that needs to be automatically adjusted of the virtual control object.

\* \* \* \* \*